US011893946B2

(12) United States Patent
Kang et al.

(10) Patent No.: US 11,893,946 B2
(45) Date of Patent: Feb. 6, 2024

(54) DISPLAY DEVICE

(71) Applicant: Samsung Display Co., Ltd., Yongin-si (KR)

(72) Inventors: Sun-Koo Kang, Yongin-si (KR); Hyunha Yang, Yongin-si (KR); Myeongbin Lim, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/098,922

(22) Filed: Jan. 19, 2023

(65) Prior Publication Data

US 2023/0343296 A1 Oct. 26, 2023

(30) Foreign Application Priority Data

Apr. 20, 2022 (KR) ........................ 10-2022-0049041

(51) Int. Cl.
*G09G 3/3275* (2016.01)
*G09G 3/3233* (2016.01)

(52) U.S. Cl.
CPC ......... *G09G 3/3275* (2013.01); *G09G 3/3233* (2013.01); *G09G 2300/0819* (2013.01); *G09G 2300/0842* (2013.01); *G09G 2310/0291* (2013.01); *G09G 2310/08* (2013.01); *G09G 2330/021* (2013.01); *G09G 2330/028* (2013.01)

(58) Field of Classification Search
CPC ............... G09G 3/3275; G09G 3/3233; G09G 2300/0819; G09G 2300/0842; G09G 2310/0291; G09G 2310/08; G09G 2330/021; G09G 2330/028
See application file for complete search history.

(56) References Cited

U.S. PATENT DOCUMENTS

| | | | | |
|---|---|---|---|---|
| 8,907,872 | B2 | 12/2014 | Shin et al. | |
| 10,755,662 | B2 | 8/2020 | Kong et al. | |
| 11,315,462 | B2 | 4/2022 | Lee et al. | |
| 2006/0120202 | A1 | 6/2006 | Kim et al. | |
| 2016/0098959 | A1* | 4/2016 | Moon | G09G 3/2092 345/205 |
| 2016/0203769 | A1* | 7/2016 | Lee | G09G 3/20 345/690 |

(Continued)

FOREIGN PATENT DOCUMENTS

| | | | |
|---|---|---|---|
| KR | 100600314 | B1 | 7/2006 |
| KR | 101919502 | B1 | 11/2018 |

(Continued)

*Primary Examiner* — Jonathan A Boyd
(74) *Attorney, Agent, or Firm* — CANTOR COLBURN LLP

(57) ABSTRACT

A display device includes: a display panel, a data driver, and a scan driver. The data driver outputs data signals during a writing frame and outputs a bias voltage during a holding frame. The data driver includes a plurality of driving chips, and each of the driving chips includes: a gamma voltage generator, a data converter, a main output part for outputting corresponding data signals of the data signals during the writing frame, and a sub-output part for outputting the bias voltage during the holding frame. The gamma voltage generator of a selected driving chip among the plurality of driving chips is electrically connected to the sub-output parts disposed in the plurality of driving chips, respectively.

20 Claims, 17 Drawing Sheets

(56) References Cited

U.S. PATENT DOCUMENTS

| | | | | |
|---|---|---|---|---|
| 2020/0243008 | A1* | 7/2020 | Lee | G09G 3/3258 |
| 2020/0286448 | A1* | 9/2020 | Kim | G09G 5/18 |
| 2020/0312215 | A1* | 10/2020 | You | G09G 3/2011 |
| 2021/0183293 | A1* | 6/2021 | Piao | G09G 3/20 |

FOREIGN PATENT DOCUMENTS

| | | | |
|---|---|---|---|
| KR | 1020180121328 | A | 11/2018 |
| KR | 1020200093745 | A | 8/2020 |
| KR | 1020210084057 | A | 7/2021 |

* cited by examiner

DISPLAY DEVICE

This application claims priority to Korean Patent Application No. 10-2022-0049041, filed on Apr. 20, 2022, and all the benefits accruing therefrom under 35 U.S.C. § 119, the content of which in its entirety is herein incorporated by reference.

BACKGROUND

The invention relates to a display device, and more particularly, relates to a display device capable of reducing power consumption.

Among display devices, a light emitting display device displays an image using a light emitting diode that generates light by recombination of electrons and holes. Such a light emitting display device has a fast response speed and is driven with low power consumption.

The display device includes a display panel for displaying an image, a scan driver for sequentially supplying scan signals to scan lines provided on the display panel, and a data driver for supplying data signals to data lines provided on the display panel.

SUMMARY

An embodiment of the invention provides a display device capable of reducing power consumed in a data driver.

According to an embodiment of the invention, a display device includes a display panel including a plurality of pixels, a data driver, and a scan driver.

The data driver outputs data signals to the plurality of pixels during a writing frame and outputs a bias voltage to the plurality of pixels during a holding frame. The scan driver outputs scan signals to the plurality of pixels.

The data driver includes a plurality of driving chips, and each of the plurality of driving chips includes a gamma voltage generator for outputting a gamma voltage, a data converter converting image data into corresponding data signals of the data signals based on the gamma voltage, a main output part for outputting the corresponding data signals during the writing frame, and a sub-output part for outputting the bias voltage during the holding frame.

The gamma voltage generator of a selected driving chip among the plurality of driving chips is electrically connected to the sub-output parts disposed in the plurality of driving chips respectively.

According to an embodiment of the invention, a display device includes a display panel including a plurality of pixels, a data driver, and a scan driver.

The data driver outputs data signals to the plurality of pixels during a writing frame and outputs a bias voltage to the plurality of pixels during a holding frame. The scan driver outputs scan signals to the plurality of pixels.

The data driver includes a plurality of driving chips, and each of the plurality of driving chips includes a main output part for outputting corresponding data signals among the data signals during the writing frame, and a sub-output part for outputting the bias voltage during the holding frame.

A driving chip selected from among the plurality of driving chips further includes a bias voltage generator for generating the bias voltage, and the bias voltage generator is electrically connected to the sub-output parts disposed in the plurality of driving chips, respectively.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Figure 1:
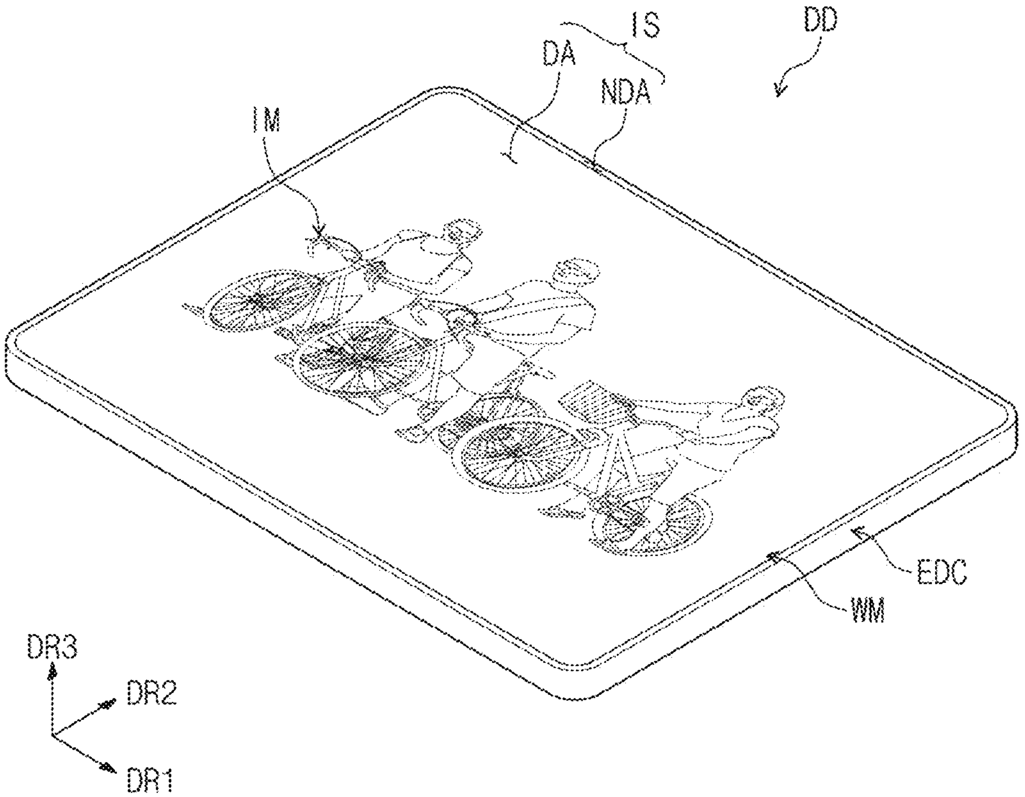
FIG. 1 is a perspective view of a display device according to an embodiment of the invention.

When a component (or an area, a layer, a part, etc.) is referred to as being "on," "connected to," or "coupled to" another element, it may be directly on, connected to, or coupled to the other component or intervening components may be present.

Like reference numerals denote like elements. Additionally, in the drawings, thicknesses, proportions, and dimensions of components are exaggerated for effective description of technical content. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” The term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms “first,” “second,” etc. may be used herein to describe various components, these components should not be limited by these terms. These terms are only used to distinguish one component from another component. For example, a first component discussed below could be termed a second component without departing from the teachings of embodiments. The singular forms are intended to include the plural forms as well, unless the context clearly indicates otherwise.

In addition, terms such as “below,” “lower,” “above,” “upper,” and the like are used to describe the relationship of the configurations shown in the drawings. The terms are used as a relative concept and are described with reference to the direction indicated in the drawings.

It should be understood that the terms “comprise”, or “have” are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, embodiments of the invention will be described with reference to the drawings.

Figure 2:
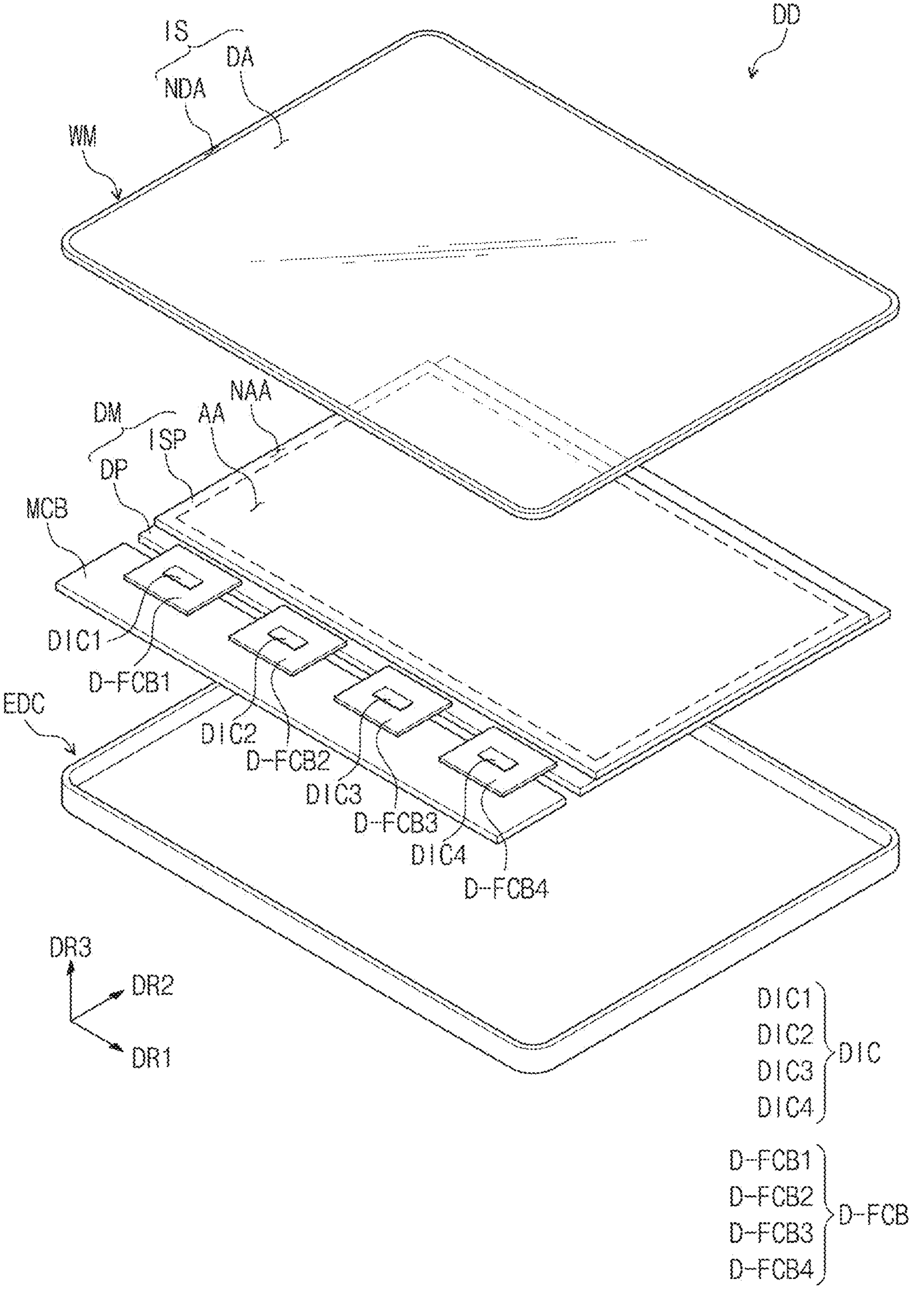
FIG. 2 is an exploded perspective view of a display device according to an embodiment of the invention.

FIG. 1 is a perspective view of a display device according to an embodiment of the invention, and FIG. 2 is an exploded perspective view of a display device according to an embodiment of the invention.

Referring to FIGS. 1 and 2, a display device DD may be a device activated in response to an electrical signal. The display device DD according to the invention may be a large-sized display device such as a television or a monitor, or a small/mid-sized display device such as a mobile phone, a tablet, a notebook computer, a car navigation system, and a game machine. These are merely presented as examples, and the display device DD may be implemented in other forms without departing from the concept of the invention. The display device DD has a rectangular shape having a long side in a first direction DR1 and a short side in a second direction DR2 crossing the first direction DR1. However, the shape of the display device DD is not limited thereto, and various shapes of the display device DD may be provided. The display device DD may display an image IM in a third direction DR3 on a display surface IS parallel to each of the first and second directions DR1 and DR2. The display surface IS on which the image IM is displayed may correspond to a front surface of the display device DD.

In this embodiment, the front surface (or upper surface) and a rear surface (or lower surface) of each member are defined based on a direction in which the image IM is displayed. The front surface and the rear surface may be opposite to each other in the third direction DR3, and a normal direction of each of the front surface and the rear surface may be parallel to the third direction DR3.

A distance between the front surface and the rear surface in the third direction DR3 may correspond to a thickness of the display device DD in the third direction DR3. Meanwhile, the directions indicated by the first to third directions DR1, DR2, and DR3 may be relative concepts and may be converted into other directions.

The display device DD may detect an external input applied from the outside. The external input may include various types of inputs provided from the outside of the display device DD. The display device DD according to an embodiment of the invention may detect a user’s external input applied from the outside. The user’s external input may be any one or a combination of various types of external inputs, such as a part of the user’s body, light, heat, gaze, or pressure. In addition, the display device DD may detect a user’s external input applied to a side surface or the rear surface of the display device DD depending on a structure of the display device DD, and is not limited to any one embodiment. As an example of the invention, the external input may include an input by an input device (e.g., a stylus pen, an active pen, a touch pen, an electronic pen, an e-pen, etc.).

The display surface IS of the display device DD may be divided into a display area DA and a non-display area NDA. The display area DA may be an area in which the image IM is displayed. A user recognizes the image IM through the display area DA. In the present embodiment, the display area DA has a rectangular shape with rounded vertices. However, this is illustrated by way of example, and the display area DA may have various shapes, and is not limited to any one embodiment.

The non-display area NDA is adjacent to the display area DA. The non-display area NDA may have a certain color. The non-display area NDA may surround the display area DA. Accordingly, the shape of the display area DA may be substantially defined by the non-display area NDA. However, this is illustrated by way of example, and the non-display area NDA may be disposed adjacent to only one side of the display area DA, or may be omitted. The display device DD according to an embodiment of the invention may include various embodiments, and is not limited to any one embodiment.

As shown in FIG. 2, the display device DD may include a display module DM and a window WM disposed on the display module DM. The display module DM may include a display panel DP and an input sensing layer ISP.

The display panel DP according to an embodiment of the invention may be a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include quantum dots, quantum rods, and the like.

The display panel DP may output the image IM, and the output image IM may be displayed through the display surface IS.

The input sensing layer ISP may be disposed on the display panel DP to sense an external input. The input sensing layer ISP may be directly disposed on the display panel DP. According to an embodiment of the invention, the input sensing layer ISP may be formed on the display panel DP by a continuous process. That is, when the input sensing layer ISP is directly disposed on the display panel DP, an internal adhesive film (not shown) is not disposed between the input sensing layer ISP and the display panel DP. However, an internal adhesive film may be disposed between the input sensing layer ISP and the display panel DP. In this case, the input sensing layer ISP may not be manufactured by the continuous process with the display panel DP, but may be manufactured through a process separate from the display panel DP, and then may be fixed to an upper surface of the display panel DP by the internal adhesive film.

The window WM may be formed of a transparent material capable of emitting the image IM. For example, the window WM may be formed of glass, sapphire, plastic, or the like. The window WM is illustrated as a single layer, but is not limited thereto and may include a plurality of layers in another embodiment.

Although not shown, the above-described non-display area NDA of the display device DD may be provided as an area in which a material including a certain color is printed on one area of the window WM. As an example of the invention, the window WM may include a light blocking pattern for defining the non-display area NDA. The light blocking pattern may be formed as a colored organic layer, for example, by a coating method.

The window WM may be coupled to the display module DM through an adhesive film. As an example of the invention, the adhesive film may include an optically clear adhesive film ("OCA" film). However, the adhesive film is not limited thereto, and may include a conventional adhesive or pressure-sensitive adhesive in another embodiment. For example, the adhesive film may include an optically clear resin ("OCR") or a pressure sensitive adhesive film ("PSA" film).

An anti-reflection layer may be further disposed between the window WM and the display module DM. The anti-reflection layer reduces reflectance of external light incident from an upper side of the window WM. The anti-reflection layer according to an embodiment of the invention may include a phase retarder and a polarizer. The retarder may be a film type or liquid crystal coating type, and may include a $\lambda/2$ phase retarder and/or a $\lambda/4$ phase retarder. The polarizer may also be a film type or a liquid crystal coating type. The film type may include a stretched synthetic resin film, and the liquid crystal coating type may include liquid crystals arranged in a certain arrangement. The phase retarder and the polarizer may be implemented as one polarizing film.

As an example of the invention, the anti-reflection layer may include color filters. An arrangement of the color filters may be determined in consideration of colors of light generated by a plurality of pixels PX (refer to FIG. 3) included in the display panel DP. In this case, the anti-reflection layer may further include a light blocking pattern disposed between color filters.

The display module DM may display the image IM in response to an electrical signal and may transmit/receive information about an external input. The display module DM may be defined as an active area AA and a non-active area NAA. The active area AA may be defined as an area (i.e., an area where the image IM is displayed) where the image IM is emitted from the display panel DP. Also, the active area AA may be defined as an area in which the input sensing layer ISP senses an external input applied from the outside. According to an embodiment, the active area AA of the display module DM may correspond to (or overlap) at least a portion of the display area DA.

The non-active area NAA is adjacent to the active area AA. The non-active area NAA may be an area in which the image IM is not substantially displayed. For example, the non-active area NAA may surround the active area AA. However, this is illustrated by way of example, and the non-active area NAA may be defined in various shapes and is not limited to any one embodiment. According to an embodiment, the non-active area NAA of the display module DM may correspond to (or overlap) at least a portion of the non-display area NDA.

The display module DM may further include a main circuit board MCB, flexible circuit films D-FCB, and driving chips DIC. The main circuit board MCB may be connected to the flexible circuit films D-FCB to be electrically connected to the display panel DP. The flexible circuit films D-FCB are connected to the display panel DP to electrically connect the display panel DP and the main circuit board MCB. The main circuit board MCB may include a plurality of driving elements. The plurality of driving elements may include a circuit part for driving the display panel DP. The driving chips DIC may be mounted on the flexible circuit films D-FCB.

In one embodiment of the invention, the flexible circuit films D-FCB may include a first flexible circuit film D-FCB1, a second flexible circuit film D-FCB2, a third flexible circuit film D-FCB3, and a fourth flexible circuit film D-FCB4. As an example of the invention, the driving chips DIC may include a first driving chip DIC1, a second driving chip DIC2, a third driving chip DIC3, and a fourth driving chip DIC4. The first to fourth flexible circuit films D-FCB1, D-FCB2, D-FCB3, and D-FCB4 may be spaced apart from one another in the first direction DR1 and may be connected to the display panel DP to electrically connect the display panel DP to the main circuit board MCB. The first driving chip DIC1 may be mounted on the first flexible circuit film D-FCB1, and the second driving chip DIC2 may be mounted on the second flexible circuit film D-FCB2. The third driving chip DIC3 may be mounted on the third flexible circuit film D-FCB3, and the fourth driving chip DIC4 may be mounted on the fourth flexible circuit film D-FCB4. However, embodiments of the invention are not limited thereto. For example, the display panel DP may be electrically connected to the main circuit board MCB through one flexible circuit film, and one or more driving chips may be mounted on one flexible circuit film in another embodiment. In addition, the number of driving chips is not particularly limited, and in the invention, two or more driving chips may be provided.

Although a structure in which the first to fourth driving chips DIC1, DIC2, DIC3, and DIC4 are mounted on the first to fourth driving chips DIC1, DIC2, DIC3, and DIC4, respectively, is illustrated in FIG. 2, the invention is not limited thereto. For example, the first to fourth driving chips DIC1, DIC2, DIC3, and DIC4 may be directly mounted on the display panel DP in another embodiment. In this case, portions on which the first to fourth driving chips DIC1, DIC2, DIC3, and DIC4 are mounted of the display panel DP may be bent to be disposed on a rear surface of the display module DM. Alternatively, the first to fourth driving chips DIC1, DIC2, DIC3, and DIC4 may be directly mounted on the main circuit board MCB.

The input sensing layer ISP may be electrically connected to the main circuit board MCB through the flexible circuit films D-FCB. However, embodiments of the invention are not limited thereto. That is, the display module DM may additionally include a separate flexible circuit film for electrically connecting the input sensing layer ISP to the main circuit board MCB in another embodiment.

The display device DD further includes an outer case EDC for accommodating the display module DM. The outer case EDC may be combined with the window WM to define an appearance of the display device DD. The outer case EDC absorbs a shock applied from the outside and prevents foreign substances/moisture from penetrating into the display module DM to protect the components accommodated in the outer case EDC. Meanwhile, as an example of the invention, the outer case EDC may be provided in a form in which a plurality of accommodation members that are assembled with each other.

The display device DD according to an embodiment may include an electronic module including various functional modules for operating the display module DM, a power supply module (e.g., a battery) for supplying power necessary for the overall operation of the display device DD, and a bracket that is combined with the display module DM and/or the outer case EDC to divide an internal space of the display device DD.

Figure 3:
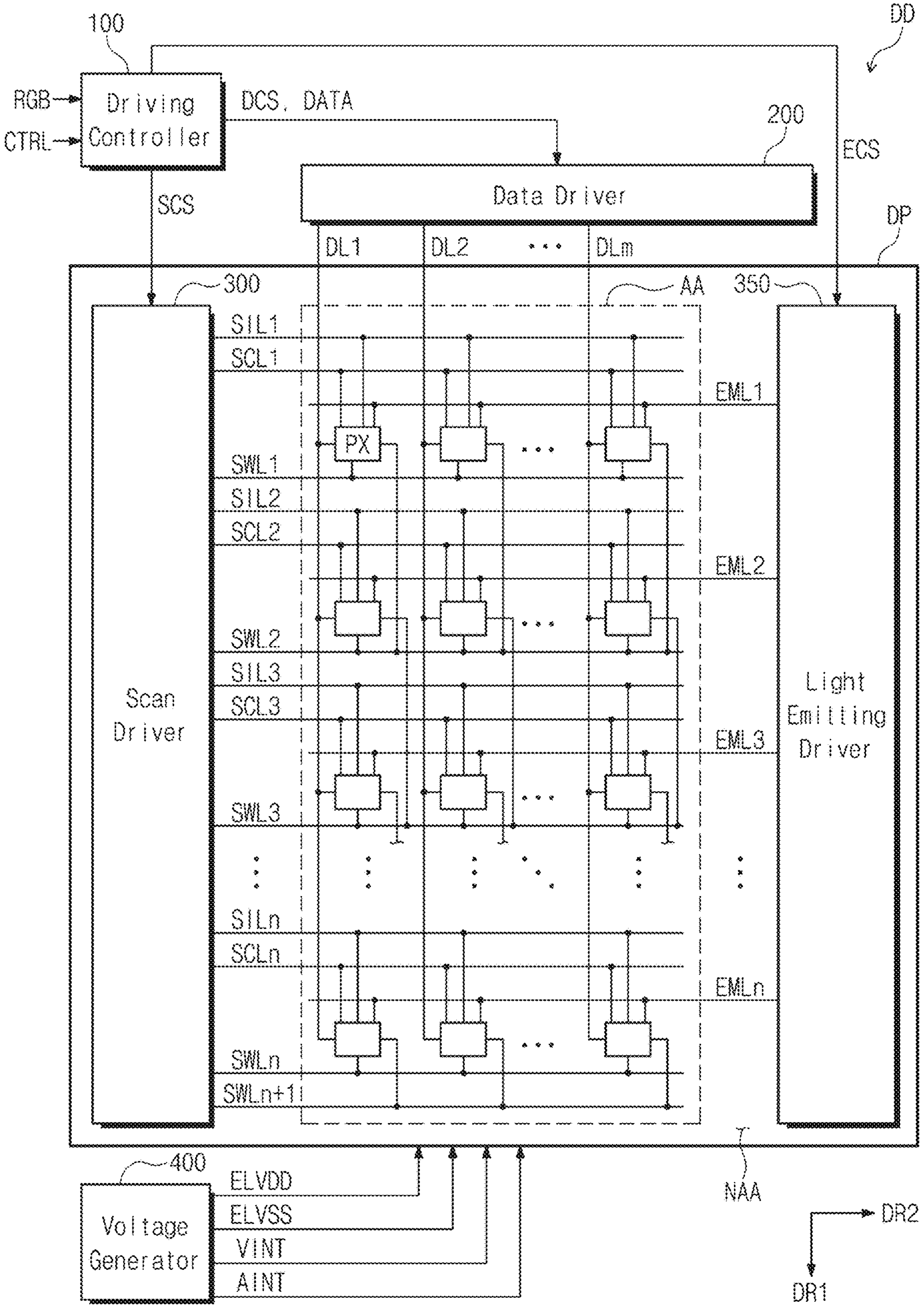
FIG. 3 is a block diagram of a display device according to an embodiment of the invention.
Figure 4:
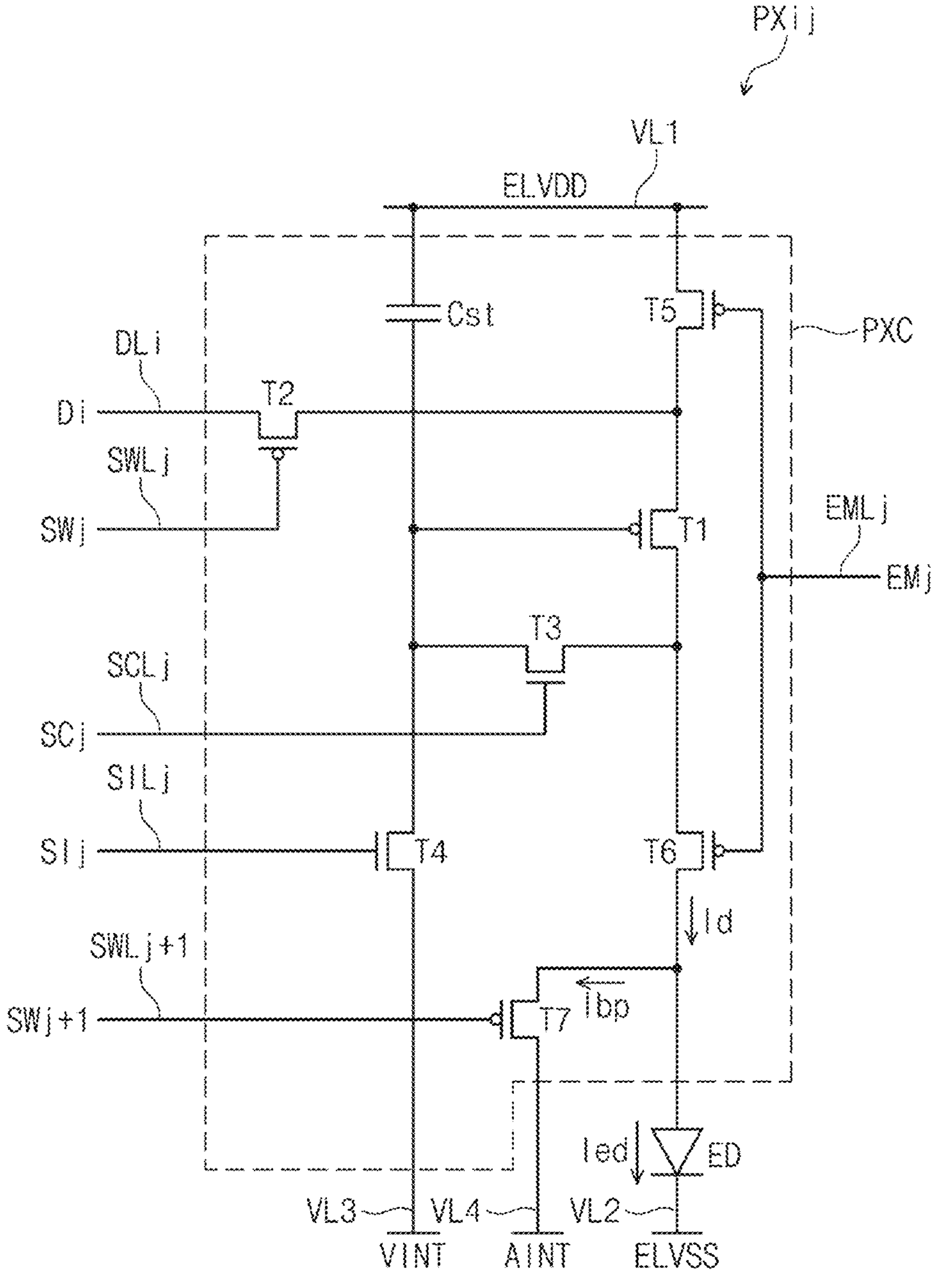
FIG. 4 is a circuit diagram of a pixel according to an embodiment of the invention.
Figure 5:
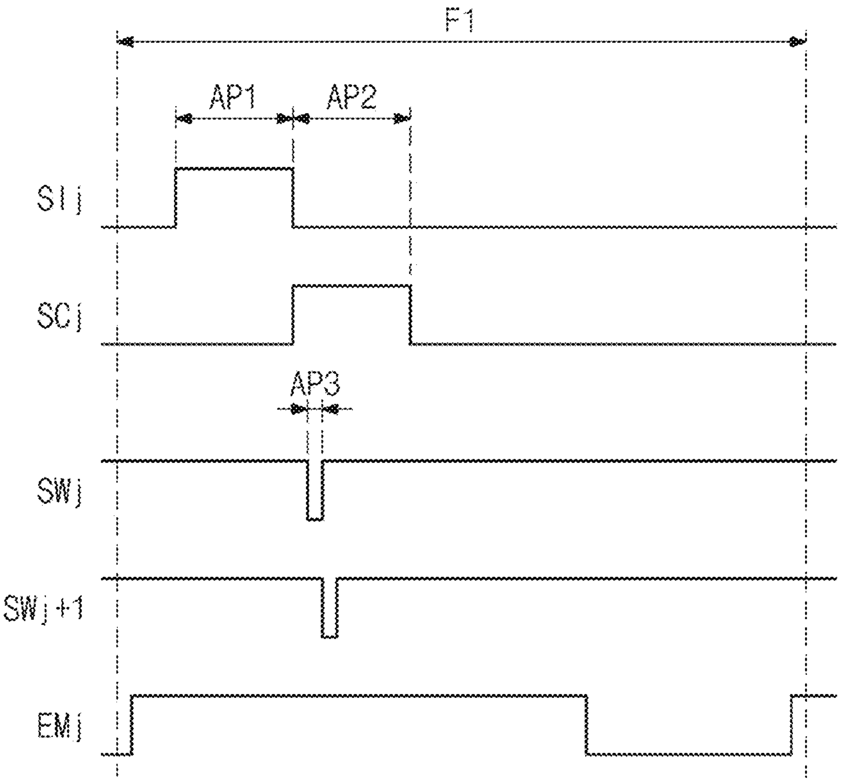
FIG. 5 is a timing diagram for illustrating an operation of a pixel in a first driving mode according to an embodiment of the invention.
Figure 6:
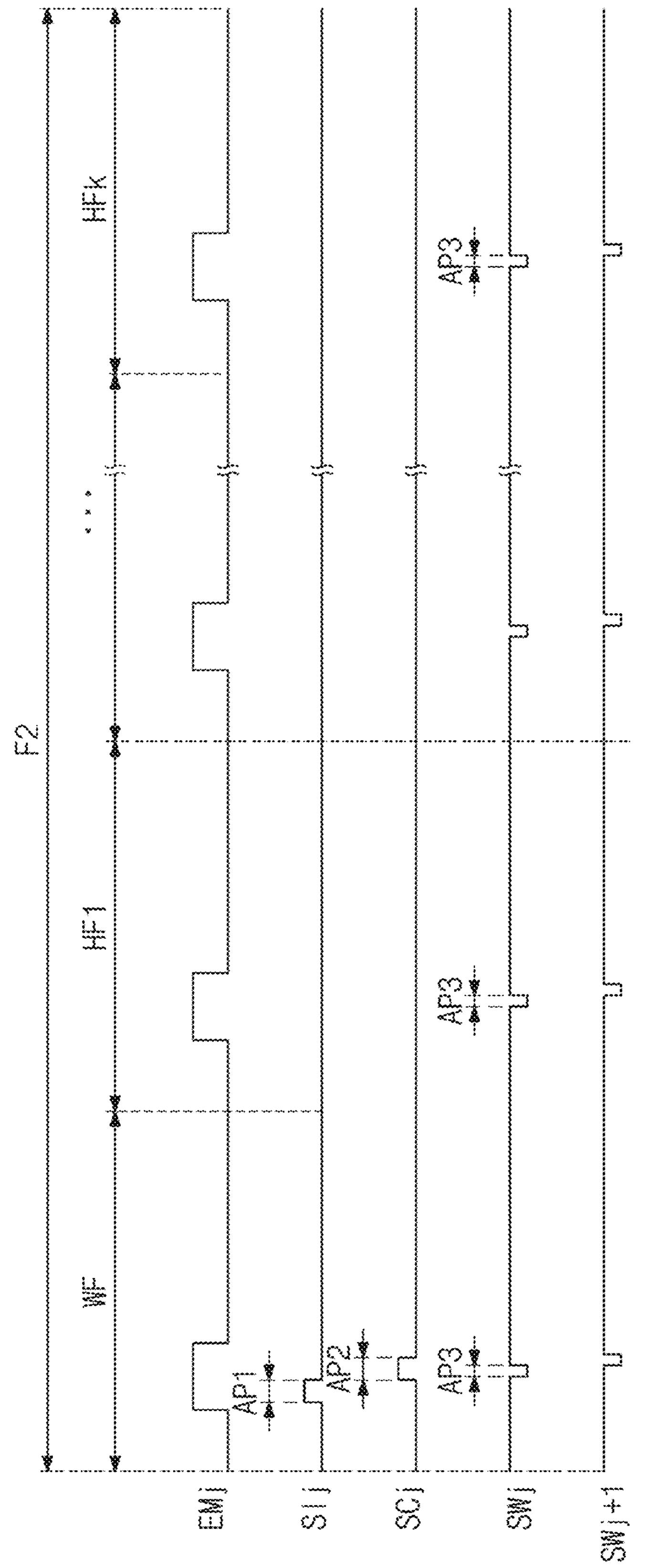
FIG. 6 is a timing diagram for illustrating an operation of a pixel in a second driving mode according to an embodiment of the invention.

FIG. 3 is a block diagram of a display device according to an embodiment of the invention, and FIG. 4 is a circuit diagram of a pixel according to an embodiment of the invention. FIG. 5 is a timing diagram for illustrating an operation of a pixel in a first driving mode according to an embodiment of the invention, and FIG. 6 is a timing diagram for illustrating an operation of a pixel in a second driving mode according to an embodiment of the invention.

Referring to FIGS. 3 and 4, a display device DD includes a display panel DP, a panel driver for driving the display panel DP, and a driving controller 100 for controlling an operation of the panel driver. As an example of the invention, the panel driver includes a data driver 200, a scan driver 300, a light emitting driver 350, and a voltage generator 400.

The driving controller 100 receives an input image signal RGB and a control signal CTRL. The driving controller 100 generates an image data RIB by converting a data format of the input image signal RGB in compliance with the specification for an interface with the data driver 200. The driving controller 100 generates a first driving control signal SCS, a second driving control signal DCS, and a third driving control signal ECS, based on the control signal CTRL.

The data driver 200 receives the second driving control signal DCS and the image data DATA from the driving controller 100. The data driver 200 converts the image data DATA into data signals and outputs the data signals to a plurality of data lines DL1 to DLm to be described later. The data signals are analog voltages corresponding to greyscale values of the image data DATA. As an example of the invention, the data driver 200 may include a plurality of driving chips (e.g., first to fourth driving chips DIC1 to DIC4 illustrated in FIG. 2).

The scan driver 300 receives the first driving control signal SCS from the driving controller 100. The scan driver 300 may output scan signals to scan lines in response to the first driving control signal SCS.

The voltage generator 400 generates voltages necessary for the operation of the display panel DP. In this embodiment, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, light emission control lines EML1 to EMLn, data lines DL1 to DLm, and pixels PX. The initialization scan lines SIL1 to SILn, the compensation scan lines SCL1 to SCLn, the write scan lines SWL1 to SWLn+1, the light emission control lines EML1 to EMLn, the data lines DL1 to DLm and the pixels PX may overlap the display area DA. The initialization scan lines SIL1 to SILn, the compensation scan lines SCL1 to SCLn, the write scan lines SWL1 to SWLn+1, and the light emission control lines EML1 to EMLn extend in the second direction DR2. The initialization scan lines SIL1 to SILn, the compensation scan lines SCL1 to SCLn, the write scan lines SWL1 to SWLn+1, and the light emission control lines EML1 to EMLn are arranged to be spaced apart from one another in the first direction DR1. The data lines DL1 to DLm extend in the first direction DR1 and are arranged to be spaced apart from one another in the second direction DR2.

The plurality of pixels PX are electrically connected to the initialization scan lines SIL1 to SILn, the compensation scan lines SCL1 to SCLn, the write scan lines SWL1 to SWLn+1, the light emission control lines EML1 to EMLn, and the data lines DL1 to DLm, respectively. Each of the plurality of pixels PX may be electrically connected to four scan lines. For example, as shown in FIG. 3, pixels in a first row may be connected to the first initialization scan line SIL1, the first compensation scan line SCL1, and the first and second write scan lines SWL1 and SWL2. Also, pixels in a second row may be connected to the second initialization scan line SIL2, the second compensation scan line SCL2, and the second and third write scan lines SWL2 and SWL3.

The scan driver 300 may be disposed in the non-active NAA of the display panel DP. The scan driver 300 receives the first driving control signal SCS from the driving controller 100. The scan driver 300 may output initialization scan signals to the initialization scan lines SIL1 to SILn, output compensation scan signals to the compensation scan lines SCL1 to SCLn, and output write scan signals to the write scan lines SWL1 to SWLn+1, in response to the first driving control signal SCS. A circuit configuration and operation of the scan driver 300 will be described in detail later.

The light emitting driver 350 receives the third driving control signal ECS from the driving controller 100. The light emitting driver 350 may output light emission control signals to the light emission control lines EML1 to EMLn in response to the third driving control signal ECS. In another embodiment, the scan driver 300 may be connected to the light emission control lines EML1 to EMLn. In this case, the scan driver 300 may output the light emission control signals to the light emission control lines EML1 to EMLn.

Each of the plurality of pixels PX includes a light emitting element ED and a pixel circuit part PXC that controls emission of the light emitting element ED. The pixel circuit part PXC may include a plurality of transistors and a capacitor. The scan driver 300 and the light emitting driver 350 may include transistors formed through the same process as the pixel circuit part PXC.

Each of the plurality of pixels PX receives the first driving voltage ELVDD, the second driving voltage ELVSS, the first initialization voltage VINT, and the second initialization voltage AINT from the voltage generator 400.

FIG. 4 is an equivalent circuit diagram of one pixel PXij among the plurality of pixels PX shown in FIG. 3 as an example. Each of the plurality of pixels PX has the same circuit structure, and thus a detailed description of the remaining pixels will be omitted as the circuit structure of the pixel PXij is described.

The pixel PXij is connected to an i-th data line DLi (hereinafter referred to as a "data line") among the data lines DL1 to DLm and a j-th light emission control line EMLj (hereinafter referred to as a "light emission control data line") among the light emission control lines EML1 to EMLn. The pixel PXij is connected to a j-th initialization scan line SILj (hereinafter, referred to as an "initialization scan line") among the initialization scan lines SIL1 to SILn, a j-th write scan line SWLj (hereinafter referred to as a "first write scan line") among the write scan lines SWL1 to SWLn+1, and a j+1th write scan line SWLj+1 (hereinafter referred to as a "second write scan line"). Also, the pixel PXij is connected to a j-th compensation scan line SCLj (hereinafter referred to as a "compensation scan line") among the compensation scan lines SCL1 to SCLn. Alternatively, the pixel PXij may be connected to a separate j-th black scan line instead of the j+1-th write scan line SWLj+1.

The pixel PXij includes the light emitting element ED and the pixel circuit part PXC. The light emitting element ED may include a light emitting diode. The light emitting diode may include an organic light emitting material, an inorganic light emitting material, quantum dots, and quantum rods as a light emitting layer.

The pixel circuit part PXC includes first to seventh transistors T1, T2, T3, T4, T5, T6, and T7 and one capacitor Cst. Each of the first to seventh transistors T1 to T7 may be a transistor having a low-temperature polycrystalline silicon ("LTPS") semiconductor layer. Some of the first to seventh transistors T1 to T7 may be P-type transistors, and others may be N-type transistors. For example, among the first to seventh transistors T1 to T7, the first, second, and fifth to seventh transistors T1, T2, T5 to T7 may be P-type transistors, and the third and fourth transistors T3 and T4 may be N-type transistors using an oxide semiconductor as a semiconductor layer. However, a configuration of the pixel circuit part PXC according to the invention is not limited to the embodiment illustrated in FIG. 4. The pixel circuit part PXC illustrated in FIG. 4 is only an example, and the configuration of the pixel circuit part PXC may be modified. For example, all of the first to seventh transistors T1 to T7 may be P-type transistors or N-type transistors in another embodiment.

The initialization scan line SILj, the compensation scan line SCLj, the first and second write scan lines SWLj and SWLj+1, and the light emission control line EMLj may transmit a j-th initialization scan signal SIj (hereinafter referred to as an "initialization scan signal"), a j-th compensation scan signal SCj (hereinafter referred to as a "compensation scan signal"), j-th and j+1-th write scan signals SWj and SWj+1 (hereinafter referred to as "first and second write scan signals") and a j-th light emission control signal EMj (hereinafter referred to as an "light emission control signal"), respectively, to the pixel PXij. A data signal Di may have a voltage level corresponding to a greyscale of a corresponding input image signal among the input image signals RGB input to the display device DD (refer to FIG. 1). First to fourth driving voltage lines VL1, VL2, VL3, and VL4 may transmit the first driving voltage ELVDD, the second driving voltage ELVSS, the first initialization voltage VINT, and the second initialization voltage AINT, respectively, to the pixel PXij.

The first transistor T1 includes a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Di transmitted from the data line DLi depending on a switching operation of the second transistor T2, and may supply a driving current Id to the light emitting element ED.

The second transistor T2 includes a first electrode connected to the data line DLi, a second electrode connected to the first electrode of the first transistor T1, and a gate electrode connected to the first write scan line SWLj. The second transistor T2 may be turned on depending on the first write scan signal SWj received through the first write scan line SWLj, and may transmit the data signal Di provided from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on depending on the compensation scan signal SCj received through the compensation scan line SCLj, and may connect the gate electrode and the second electrode of the first transistor T1 to each other, and thus the first transistor T1 may be connected in a diode manner.

The fourth transistor T4 includes a first electrode connected to the gate electrode of the first transistor T1, a second electrode connected to the third driving voltage line VL3 to which the first initialization voltage VINT is transmitted, and a gate electrode connected to the initialization scan line SILj. The fourth transistor T4 may be turned on depending on the initialization scan signal SIj received through the initialization scan line SILj, and may transmit the first initialization voltage VINT to the gate electrode of the first transistor T1, and thus an initialization operation for initializing a potential of the gate electrode of the transistor T1 may be performed.

The fifth transistor T5 includes a first electrode connected to the first driving voltage line VL1, a second electrode connected to the first electrode of the first transistor T1, and a gate electrode connected to the light emission control line EMLj.

The sixth transistor T6 includes a first electrode connected to the second electrode of the first transistor T1, a second electrode connected to the anode of the light emitting element ED, and a gate electrode connected to the light emission control line EMLj.

The fifth transistor T5 and the sixth transistor T6 are simultaneously turned on depending on the light emission control signal EMj received through the light emission control line EMLj. The first driving voltage ELVDD applied through the turned-on fifth transistor T5 may be compensated through the diode-connected first transistor T1 and then may be transmitted to the light emitting element ED.

The seventh transistor T7 includes a first electrode connected to the second electrode of the sixth transistor T6, a second electrode connected to the fourth driving voltage line VL4 to which the second initialization voltage AINT is transmitted, and a gate electrode connected to the second write scan line SWLj+1.

The one end of the capacitor Cst is connected to the gate electrode of the first transistor T1 as described above, and the other end thereof is connected to the first driving voltage line VL1. A cathode of the light emitting element ED may be connected to the second driving voltage line VL2 that transmits the second driving voltage ELVSS.

An operating frequency of the display panel DP may be defined as a panel frequency. The panel driver may drive the display panel DP at a first panel frequency in a first driving mode and may drive the display panel DP at a second panel frequency in a second driving mode. The second panel frequency may be lower than the first panel frequency. For example, the first panel frequency may have a frequency of 60 Hertz (Hz), 120 Hz, or 240 Hz, and the second panel frequency may have a frequency of 15 Hz or 30 Hz.

In the first driving mode, the display panel DP may display an image in units of a first driving frame F1. When the display panel DP operates at a first panel frequency of 60 Hz in the first driving mode, the display panel DP may display 60 images corresponding to 60 first driving frames F1, respectively, for 1 second.

During an initialization period AP1 of the first driving frame F1, when a high level initialization scan signal SIj is provided through the initialization scan line SILj, the fourth transistor T4 is turned on in response to the high level initialization scan signal SIj. The first initialization voltage VINT is transmitted to the gate electrode of the first transistor T1 through the turned-on fourth transistor T4, and the gate electrode of the first transistor T1 is initialized by the first initialization voltage VINT.

Then, during a compensation period AP2 of the first driving frame F1, when a high level compensation scan signal SCj is supplied through the compensation scan line SCLj, the third transistor T3 is turned on. The compensation period AP2 may not overlap the initialization period AP1. During the compensation period AP2, the first transistor T1 is connected by the turned-on third transistor T3 in a diode manner and is forward biased.

As an example of the invention, an activation period of the compensation scan signal SCj (i.e., corresponding to the compensation period AP2) is defined as a period in which the compensation scan signal SCj has a high level, and an activation period of the initialization scan signal SIj (i.e., corresponding to the initialization period AP1) is defined as a period in which the initialization scan signal SIj has a high level. The activation period of the compensation scan signal SCj may not overlap with the activation period of the initialization scan signal SIj. The activation period of the initialization scan signal SIj may precede the activation period of the compensation scan signal SCj. When the third and fourth transistors T3 and T4 are P-type transistors, the activation period of the compensation scan signal SCj (i.e., corresponding to the compensation period AP2) may be defined as a period in which the compensation scan signal SCj has a low level, and the activation period of the initialization scan signal SIj (i.e., corresponding to the initialization period AP1) may be defined as a period in which the initialization scan signal SIj has a low level.

The compensation period AP2 may include a data write period AP3 in which the first write scan signal SWj is generated at a low level. During the data write period AP3, the second transistor T2 is turned on by the low level first write scan signal SWj. Then, a compensation voltage "Di-Vth" reduced by a threshold voltage Vth of the first transistor T1 from the data signal Di supplied through the data line DLi is applied to the gate electrode of the first transistor T1. That is, a potential of the gate electrode of the first transistor T1 may be the compensation voltage Di-Vth.

The first driving voltage ELVDD and the compensation voltage Di-Vth may be applied to both ends of the capacitor Cst, and a charge corresponding to a voltage difference between both ends of the capacitor Cst may be stored (or charged) in the capacitor Cst.

Meanwhile, the seventh transistor T7 is turned on by receiving the low-level second write scan signal SWLj+1 through the second write scan line SWLj+1. A part of the driving current Id may escape through the seventh transistor T7 as a bypass current Ibp.

When the pixel PXij displays a black image, and the light emitting element ED emits light even though a minimum driving current of the first transistor T1 flows as the driving current Id, the pixel PXij cannot normally display the black image. Accordingly, the seventh transistor T7 in the pixel PXij according to an embodiment of the invention may distribute some of the minimum driving current of the first transistor T1 as the bypass current Ibp to a current path other than a current path toward the light emitting element ED. Here, the minimum driving current of the first transistor T1 means a current flowing through the first transistor T1, in a condition that a gate-source voltage Vgs of the first transistor T1 is less than the threshold voltage Vth and thus the first transistor T1 is turned off. Under the condition that the first transistor T1 is turned off, the minimum driving current (e.g., a current of 10 pA or less) flowing into the first transistor T1 is transmitted to the light emitting element ED, and a black greyscale image is displayed. When the pixel PXij displays the black image, an effect of the bypass current Ibp on the minimum driving current is relatively large, whereas when the pixel PXij displays an image such as a normal image or a white image, the bypass current Ibp may have little effect on the driving current Id. Accordingly, when the black image is displayed, the current (i.e., a light emitting current, led) reduced as much as the amount of the bypass current Ibp escaping from the driving current Id through the seventh transistor T7, may be provided to the light emitting device ED, to reliably represent the black image. Therefore, the pixel PXij may implement an accurate black greyscale image using the seventh transistor T7, and as a result, a contrast ratio may be improved.

Thereafter, the light emission control signal EMj supplied from the light emission control line EMLj is changed from a high level to a low level. The fifth transistor T5 and the sixth transistor T6 are turned on by the low level light emission control signal EMj. Then, the driving current Id is generated in response to a voltage difference between the gate voltage of the gate electrode of the first transistor T1 and the first driving voltage ELVDD, and the driving current Id is supplied to the light emitting element ED through the sixth transistor T6 and the current led flows through the light emitting element ED.

In the second driving mode, the display panel DP may display an image in units of the second driving frame F2. As shown in FIG. 6, the second driving frame F2 includes a writing frame and a holding frame. For example, the second driving frame F2 may include one writing frame WF and k holding frames HF1 to HFk. Here, "k" may be an integer of 1 or more. When the second panel frequency is 1 Hz, the display panel DP displays an image for one driving frame F2 for 1 second in the second driving mode. Each of the writing frame WF and the k holding frames HF1 to HFk may have a duration corresponding to the first driving frame F1. Accordingly, when the first panel frequency is 60 Hz and the second panel frequency is 1 Hz, each of the second driving frames F2 may include one writing frame WF and 59 holding frames HF1 to HFk. Here, "k" may be 59.

Each of the initialization scan signal SIj, the compensation scan signal SCj, and the first and second write scan signals SWj and SWj+1 may be activated during the writing frame WF. In the k holding frames HF1 to HFk, each of the first and second write scan signals SWj and SWj+1 is activated, and the initialization scan signal SIj and the compensation scan signal SCj are deactivated. The light emission control signal EMi may be activated in the writing frame WF and the k holding frames HF1 to HFk.

In the second driving mode, the initialization scan signal SIj and the compensation scan signal SCj may be output as the second panel frequency, whereas the light emission control signal EMi, the first and second write scan signals SWj and SWj+1 may be output as the first panel frequency.

Like the first driving frame F1, the writing frame WF may include an initialization period AP1, a compensation period AP2, and a data write period AP3. During the data write period AP3, the data signal Di is applied to the data line DLi.

Meanwhile, each of the k holding frames HF1 to HFk may include only the data write period AP3 and not include the initialization period AP1 and the compensation period AP2. During the k holding frames HF1 to HFk, the initialization scan signal SIj and the compensation scan signal SCj are maintained in an inactive state. Accordingly, during the k holding frames HF1 to HFk, the light emitting element ED may maintain the current Ted flowing to the light emitting element ED during the writing frame WF, and each of the k holding frames HF1 to HFk may maintain the displayed image during the writing frame WF.

During the data write period AP3 of each of the k holding frames HF1 to HFk, a bias voltage Vbias (refer to FIG. 7B) is applied to the data line DLi. Accordingly, the bias voltage Vbias may be applied to the first electrode of the first transistor T1 for every holding frame. As the bias voltage Vbias is applied, a leakage current flowing through the first transistor T1 is reduced to prevent a potential of the anode from being changed. Accordingly, the current Ied flowing to the light emitting element ED may be stably maintained even in the holding frames HF1 to HFk, and a change in luminance in the holding frames HF1 to HFk may be minimized.

Figure 7A:
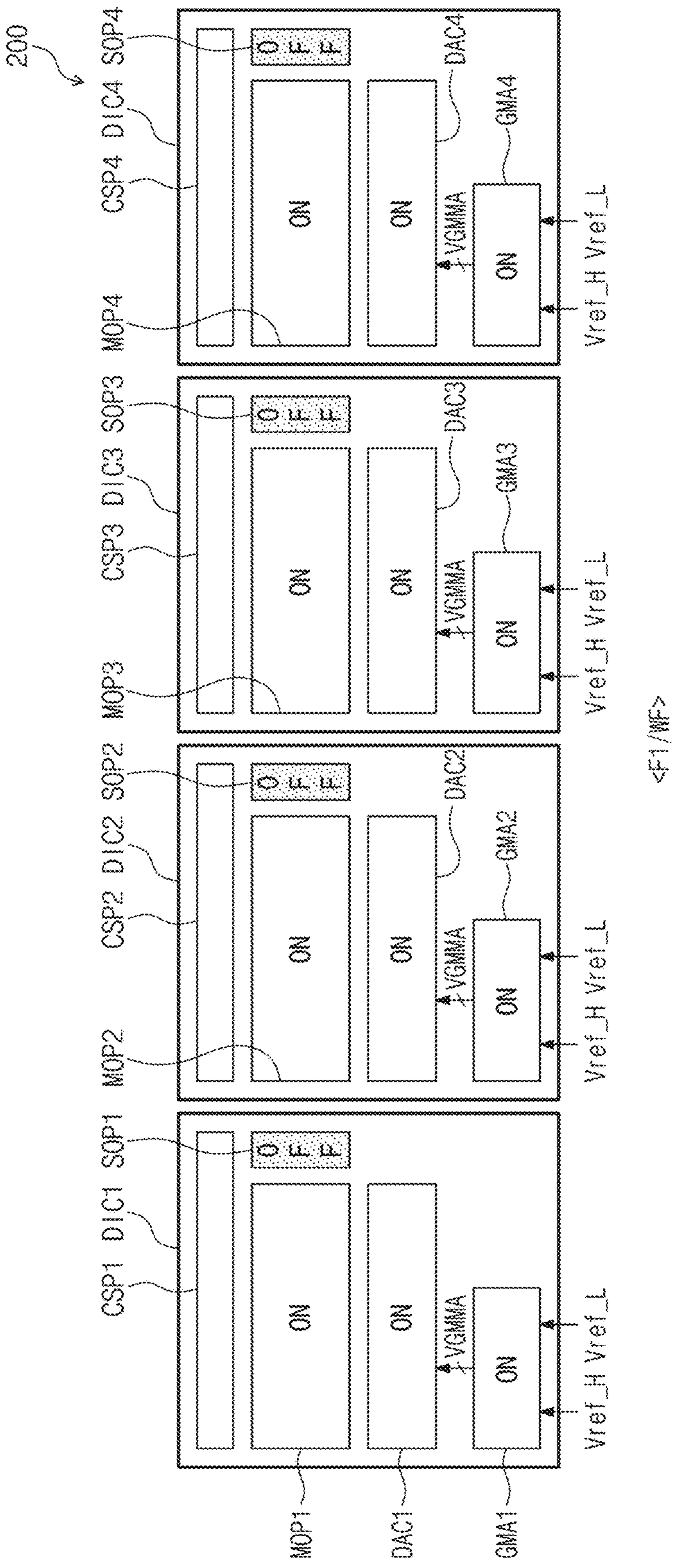
FIG. 7A is a block diagram illustrating operations of first to fourth driving chips in a first driving mode and in a writing frame of a second driving mode according to an embodiment of the invention.
Figure 7B:
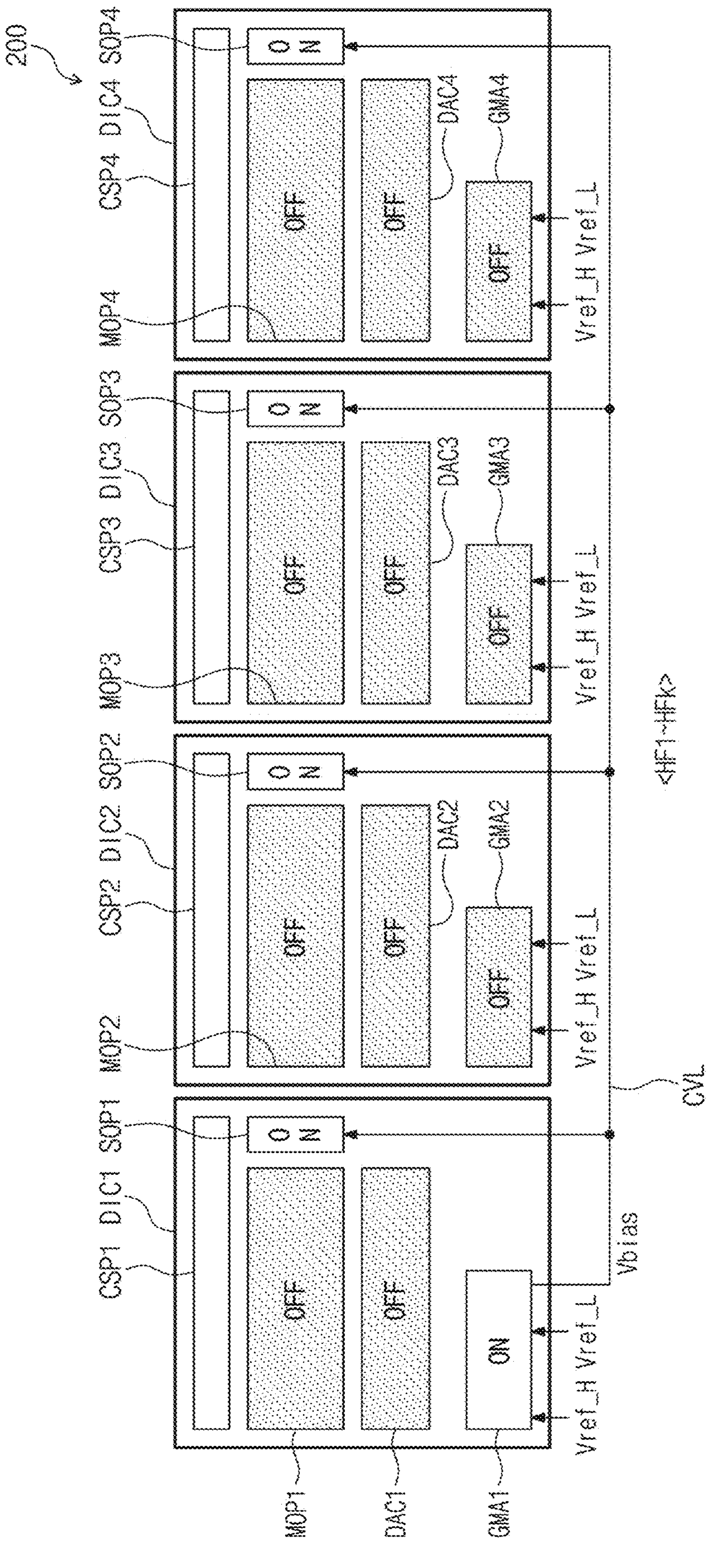
FIG. 7B is a block diagram illustrating operations of first to fourth driving chips in holding frames of the second driving mode according to an embodiment of the invention.
Figure 8A:
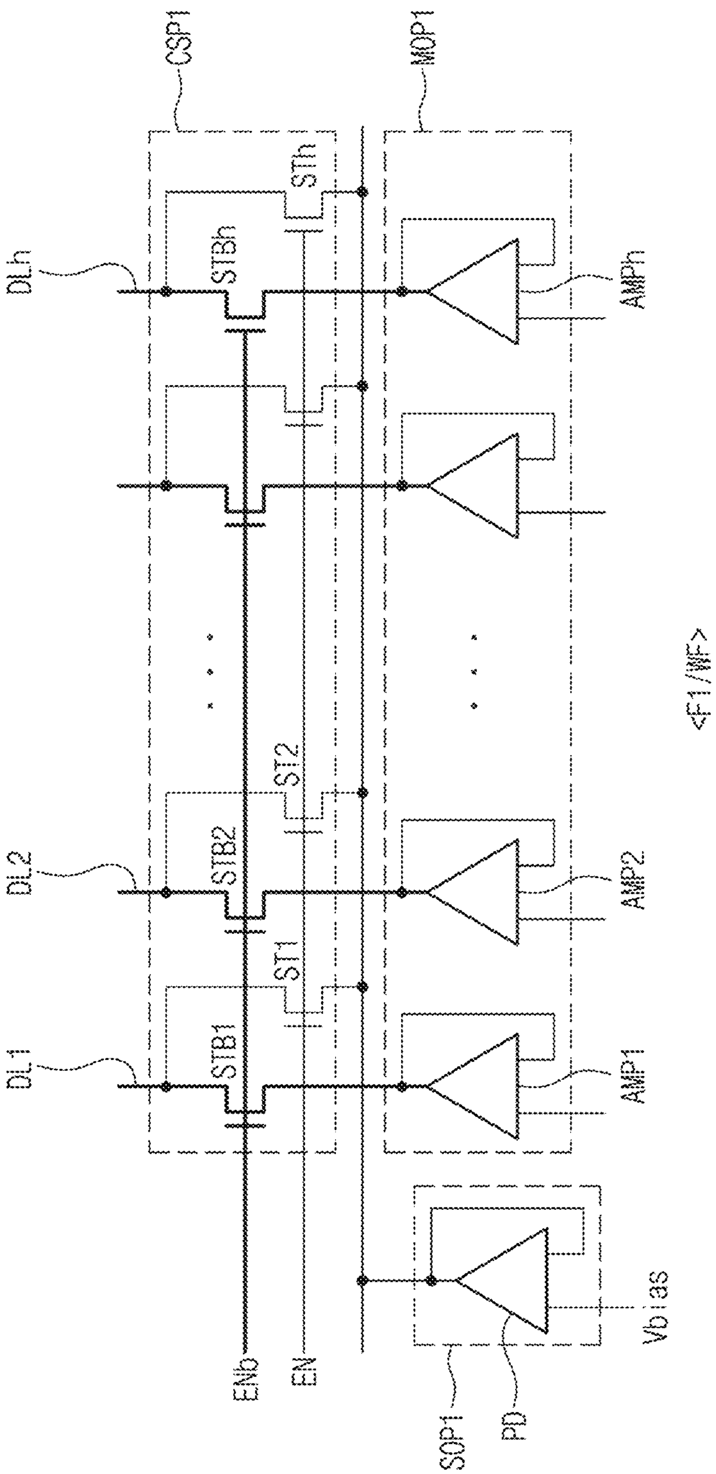
FIG. 8A is a block diagram illustrating an operation of a switching part in a first driving mode and in a writing frame of a second driving mode according to an embodiment of the invention.
Figure 8B:
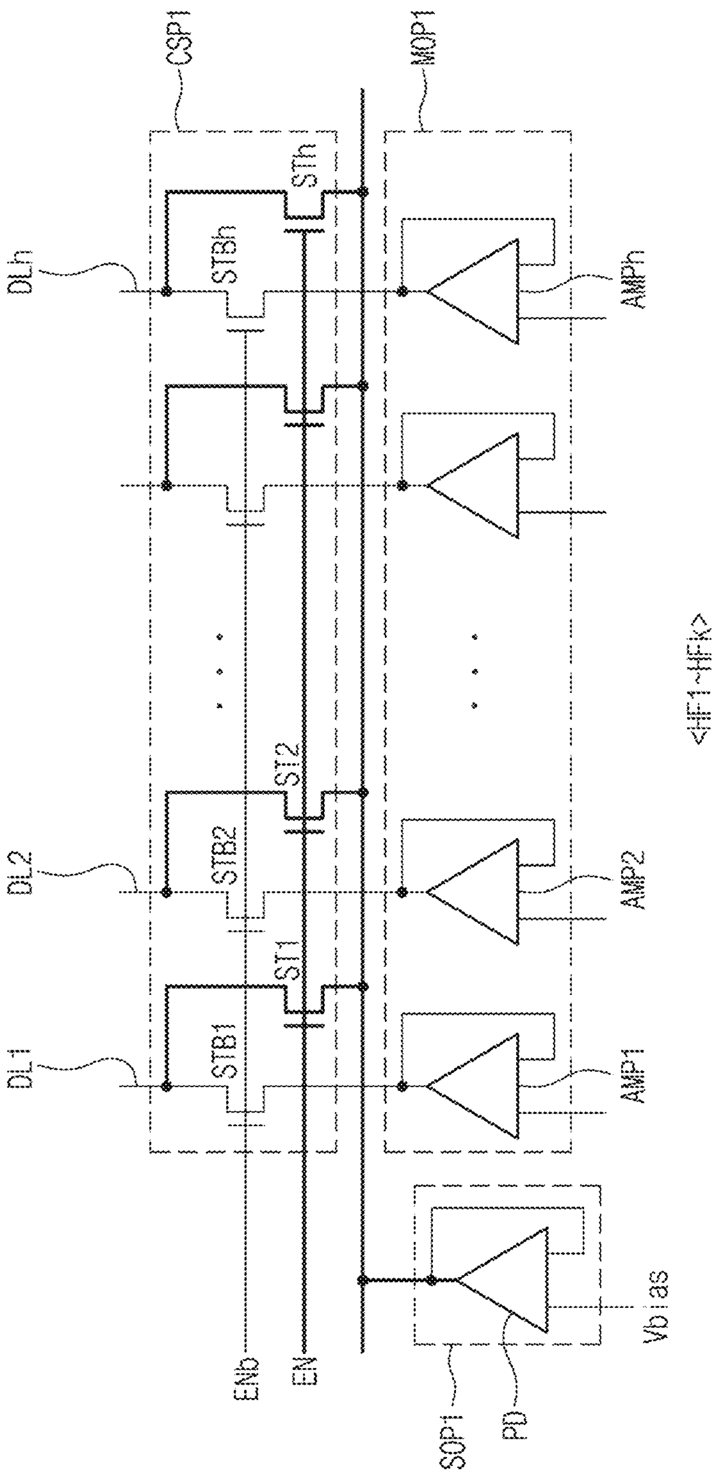
FIG. 8B is a block diagram illustrating an operation of a switching part in holding frames of the second driving mode according to an embodiment of the invention.

FIG. 7A is a block diagram illustrating operations of first to fourth driving chips in a first driving mode and in a writing frame of a second driving mode according to an embodiment of the invention, and FIG. 7B is a block diagram illustrating operations of first to fourth driving chips in holding frames of the second driving mode according to an embodiment of the invention. FIG. 8A is a block diagram illustrating an operation of a switching part in a first driving mode and in a writing frame of a second driving mode according to an embodiment of the invention, and FIG. 8B is a block diagram illustrating an operation of a switching part in holding frames of the second driving mode according to an embodiment of the invention.

Referring to FIGS. 7A and 7B, a data driver 200 includes a plurality of driving chips DIC1 to DIC4. For convenience of explanation, four driving chips DIC1 to DIC4 are illustrated in FIGS. 7A and 7B, but the number of driving chips DIC1 to DIC4 is not limited thereto.

The first driving chip DIC1 includes a first gamma voltage generator GMA1, a first data converter DAC1, a first main output part MOP1, and a first sub-output part SOP1. The second driving chip DIC2 includes a second gamma voltage generator GMA2, a second data converter DAC2, a second main output part MOP2, and a second sub-output part SOP2. The third driving chip DIC3 includes a third gamma voltage generator GMA3, a third data converter DAC3, a third main output part MOP3, and a third sub-output part SOP3. The fourth driving chip DIC4 includes a fourth gamma voltage generator GMA4, a fourth data converter DAC4, a fourth main output part MOP4, and a fourth sub-output part SOP4.

The first driving chip DIC1 may further include a first switching part CSP1 connected to the first main output part MOP1 and the first sub-output part SOP1. The second driving chip DIC2 may further include a second switching part CSP2 connected to the second main output part MOP2 and the second sub-output part SOP2. The third driving chip DIC3 may further include a third switching part CSP3 connected to the third main output part MOP3 and the third sub-output part SOP3. The fourth driving chip DIC4 may further include a fourth switching part CSP4 connected to the fourth main output part MOP4 and the fourth sub-output part SOP4.

Referring to FIG. 7A, each of the first to fourth gamma voltage generators GMA1 to GMA4 is turned on during the first driving frame F1 and the writing frame WF. Each of the first to fourth gamma voltage generators GMA1 to GMA4 receives first and second gamma reference voltages Vref_H and Vref_L. The first gamma reference voltage Vref_H may have a higher voltage level than the second gamma reference voltage Vref_L. For example, the first gamma reference voltage Vref_H may be about 7 volts (V), and the second gamma reference voltage Vref_L may be about 1V. Each of the first to fourth gamma voltage generators GMA1 to GMA4 generates gamma voltages VGMMA based on the first and second gamma reference voltages Vref_H and Vref_L. The gamma voltages VGMMA generated by each of the first to fourth gamma voltage generators GMA1 to GMA4 are provided to the first to fourth data converters DAC1 to DAC4, respectively.

During the first driving frame F1 and the writing frame WF, each of the first to fourth data converters DAC1 to DAC4 is turned on. Each of the first to fourth data converters DAC1 to DAC4 converts the image data into data signals based on the gamma voltages VGMMA. The data signals converted from the first to fourth data converters DAC1 to DAC4 are provided to the first to fourth main output parts MOP1 to MOP4, respectively.

During the first driving frame F1 and the writing frame WF, each of the first to fourth main output parts MOP1 to MOP4 is turned on, and each of the first to fourth sub-output parts SOP1 to SOP4 is turned off. Each of the first to fourth main output parts MOP1 to MOP4 outputs the data signals provided from the first to fourth data converters DAC1 to DAC4 to the first to fourth switching parts CSP1 to CSP4, respectively. During the first driving frame F1 and the writing frame WF, each of the first to fourth switching parts CSP1 to CSP4 may output data signals.

Referring to FIG. 8A, the first main output part MOP1 may include h output buffers AMP1 to AMPh, and the first sub-output part SOP1 may include one pull-down buffer PD. Here, "h" may be an integer of 1 or more. "h" may be set depending on the number (i.e., m) of data lines DL1 to DLm included in the display panel DP (refer to FIG. 3) and the number of driving chips DIC1 to DIC4. For example, when the number of driving chips DIC1 to DIC4 is 4, "h" may have a value corresponding to m/4. Although FIG. 8A illustrates that the first sub-output part SOP1 includes one pull-down buffer PD, the invention is not limited thereto. The first sub-output part SOP1 may include two or more pull-down buffers PD in another embodiment. The number of pull-down buffers PD included in the first sub-output part SOP1 may be determined depending on a load of the display panel DP (refer to FIG. 3).

The first switching part CSP1 includes h first switching elements STB1 to STBh connected to the first main output part MOP1 and h second switching elements ST1 to STh connected to the first sub-output part SOP1. During the first driving frame F1 and the writing frame WF, when the first main output part MOP1 is turned on, the first switching elements STB1 to STBh are turned on in response to a first enable signal ENb. During the first driving frame F1 and the writing frame WF, when the first sub-output part SOP1 is turned off, the second switching elements ST1 to STh are turned off in response to a second enable signal EN. Therefore, during the first driving frame F1 and the writing frame WF, the data signals output through the first main output part MOP1 may be supplied to the data lines DL1 to DLh, through the turned-on first switching elements STB1 to STBh.

In FIG. 8A, configurations of the first main output part MOP1, the first sub-output part SOP1, and the first switching part CSP1 of the first driving chip DIC1 are specifically illustrated, but the second to fourth driving chips DIC2 to DIC4 also have similar configurations, and thus a detailed description thereof is omitted.

Referring to FIG. 7B, during the k holding frames HF1 to HFk of the second driving mode, at least one selected among the first to fourth gamma voltage generators GMA1 to GMA4 is turned on, and the remaining unselected ones are turned off. For example, the first gamma voltage generator GMA1 may be turned on, and the second to fourth gamma voltage generators GMA2 to GMA4 may be turned off. However, the invention is not limited thereto. In another embodiment, the second gamma voltage generator GMA2 among the first to fourth gamma voltage generators GMA1 to GMA4 may be turned on, and in this case, the first, third, and fourth gamma voltage generators GMA1, GMA3, and GMA4 may be turned off. Here, the turned-on gamma voltage generator (i.e., the first gamma voltage generator GMA1) may be referred to as a "bias voltage generator".

During the k holding frames HF1 to HFk, the first gamma voltage generator GMA1 may generate the bias voltage Vbias based on the first and second gamma reference voltages Vref_H and Vref_L. The bias voltage Vbias may be less than or equal to the first gamma reference voltage Vref_H and greater than or equal to the second gamma reference voltage Vref_L.

During the k holding frames HF1 to HFk, the bias voltage Vbias generated from the first gamma voltage generator GMA1 is provided to the first to fourth sub-output parts SOP1 to SOP4. The data driver 200 further includes a connection wiring CVL (or a connection voltage wiring). The first gamma voltage generator GMA1 is electrically connected to the first to fourth sub-output parts SOP1 to SOP4 through the connection wiring CVL. The connection wiring CVL is commonly connected to the first to fourth sub-output parts SOP1 to SOP4. Accordingly, the bias voltage Vbias output from the first gamma voltage generator GMA1 is provided to the first to fourth sub-output parts SOP1 to SOP4 through the connection wiring CVL. The first gamma voltage generator GMA1 provided in the first driving chip DIC1 may be electrically connected to the first to fourth sub-output parts SOP1 to SOP4 which are disposed in the first to fourth driving chips DIC1 to DIC4, respectively. Therefore, the first gamma voltage generator GMA1 may commonly supply the bias voltage Vbias to the first to fourth sub-output parts SOP1 to SOP4.

During the k holding frames HF1 to HFk, each of the first to fourth data converters DAC1 to DAC4 is turned off. In addition, during the k holding frames HF1 to HFk, each of the first to fourth main output parts MOP1 to MOP4 is turned off, and each of the first to fourth sub-output parts SOP1 to SOP4 is turned on. Each of the first to fourth sub-output parts SOP1 to SOP4 outputs the bias voltage Vbias provided from the first gamma voltage generator GMA1, to the first to fourth switching parts CSP1 to CSP4. Accordingly, during the k holding frames HF1 to HFk, each of the first to fourth switching parts CSP1 to CSP4 may output the bias voltage Vbias.

Referring to FIG. 8B, during the k holding frames HF1 to HFk of the second driving mode, when the first sub-output part SOP1 is turned on, the second switching elements ST1 to STh are turned on in response to the second enable signal EN. During the k holding frames HF1 to HFk, when the first main output part MOP1 is turned off, the first switching elements STB1 to STBh are turned off in response to the first enable signal ENb. Accordingly, during the k holding frames HF1 to HFk, the bias voltage Vbias output through the first sub-output part SOP1 may be supplied to the data lines DL1 to DLh through the turned-on second switching elements ST1 to STh.

During the k holding frames HF1 to HFk, the bias voltage Vbias generated from the gamma voltage generator GMA1 provided in the selected one driving chip DIC1 among the driving chips DIC1 to DIC4 may be supplied to the sub-output parts SOP2 to SOP4 of the remaining unselected driving chips DIC2 to DIC4. Accordingly, the gamma voltage generators included in the remaining unselected driving chips may be in a turned-off state during the k holding frames HF1 to HFk. Accordingly, only one gamma voltage generator (e.g., GMA1) may be turned on to generate a bias voltage during the k holding frames HF1 to HFk, and thus overall power consumed by the data driver 200 may be effectively reduced.

Figure 9:
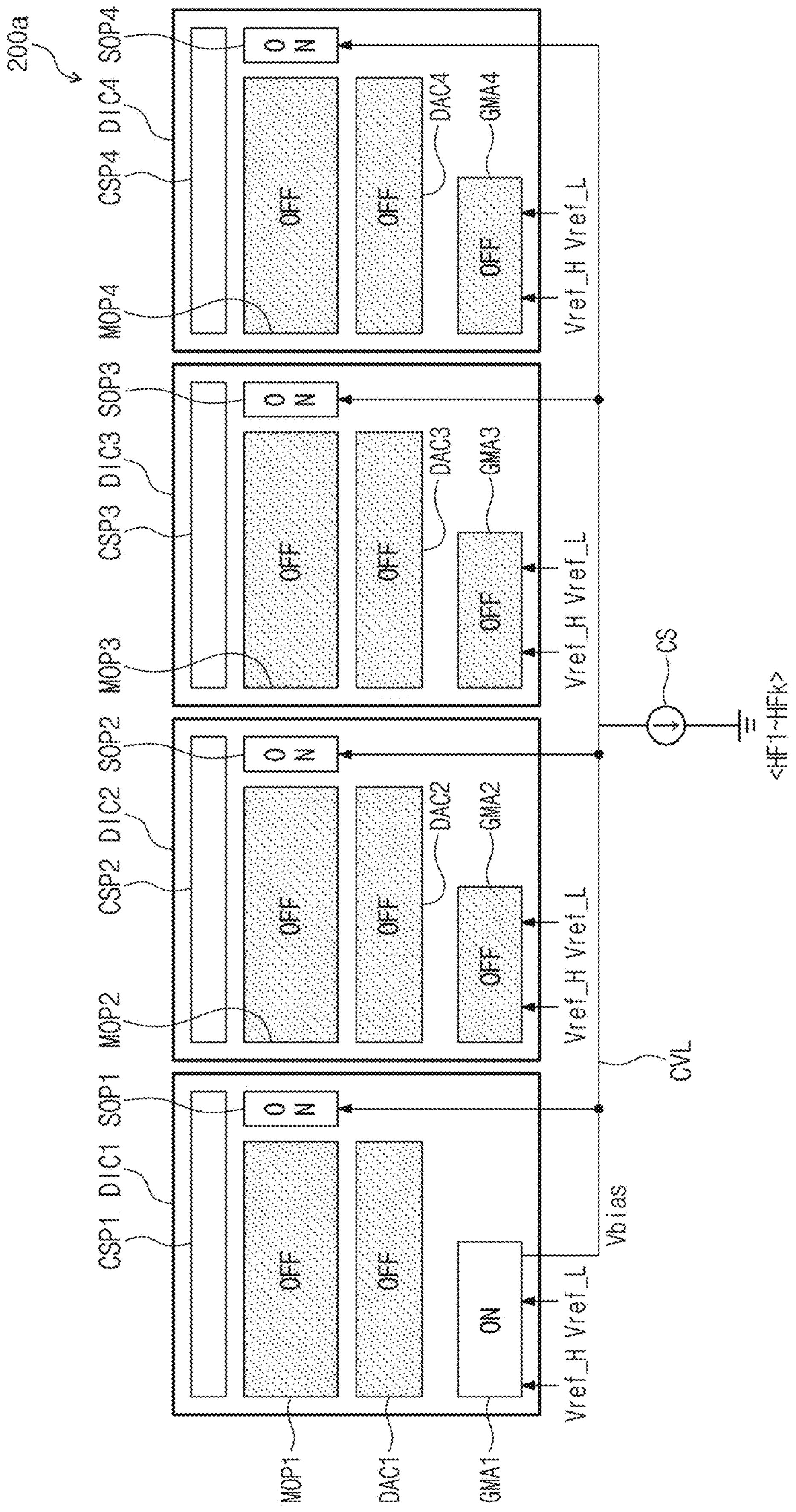
FIG. 9 is a block diagram illustrating a connection between first to fourth driving chips in holding frames of a second driving mode according to another embodiment of the invention.

FIG. 9 is a block diagram illustrating a connection between first to fourth driving chips in holding frames of a second driving mode according to another embodiment of the invention. However, among components shown in FIG. 9, the same reference numerals are used for the same components as those shown in FIG. 7B, and a detailed description thereof will be omitted.

Referring to FIG. 9, a data driver 200*a* further includes a deviation compensator CS connected to the connection wiring CVL. The deviation compensator CS may be connected to the connection wiring CVL to compensate a deviation of the bias voltage Vbias supplied to the first to fourth sub-output parts SOP1 to SOP4.

In detail, a distance deviation between the first gamma voltage generator GMA1 and the first to fourth sub-output parts SOP1 to SOP4 may occur. This distance deviation may cause a deviation between actual bias voltages substantially received by the first to fourth sub-output parts SOP1 to SOP4. As an example of the invention, the deviation compensator CS may be a current compensator. That is, the deviation compensator CS may serve to supply a constant current to the first to fourth sub-output parts SOP1 to SOP4 even when the deviation occurs between the actual bias voltages.

Accordingly, a luminance deviation in the image displayed on the display panel DP (refer to FIG. 3) due to the deviation between the actual bias voltages applied to the first to fourth sub-output parts SOP1 to SOP4, respectively, may be prevented.

Figure 10:
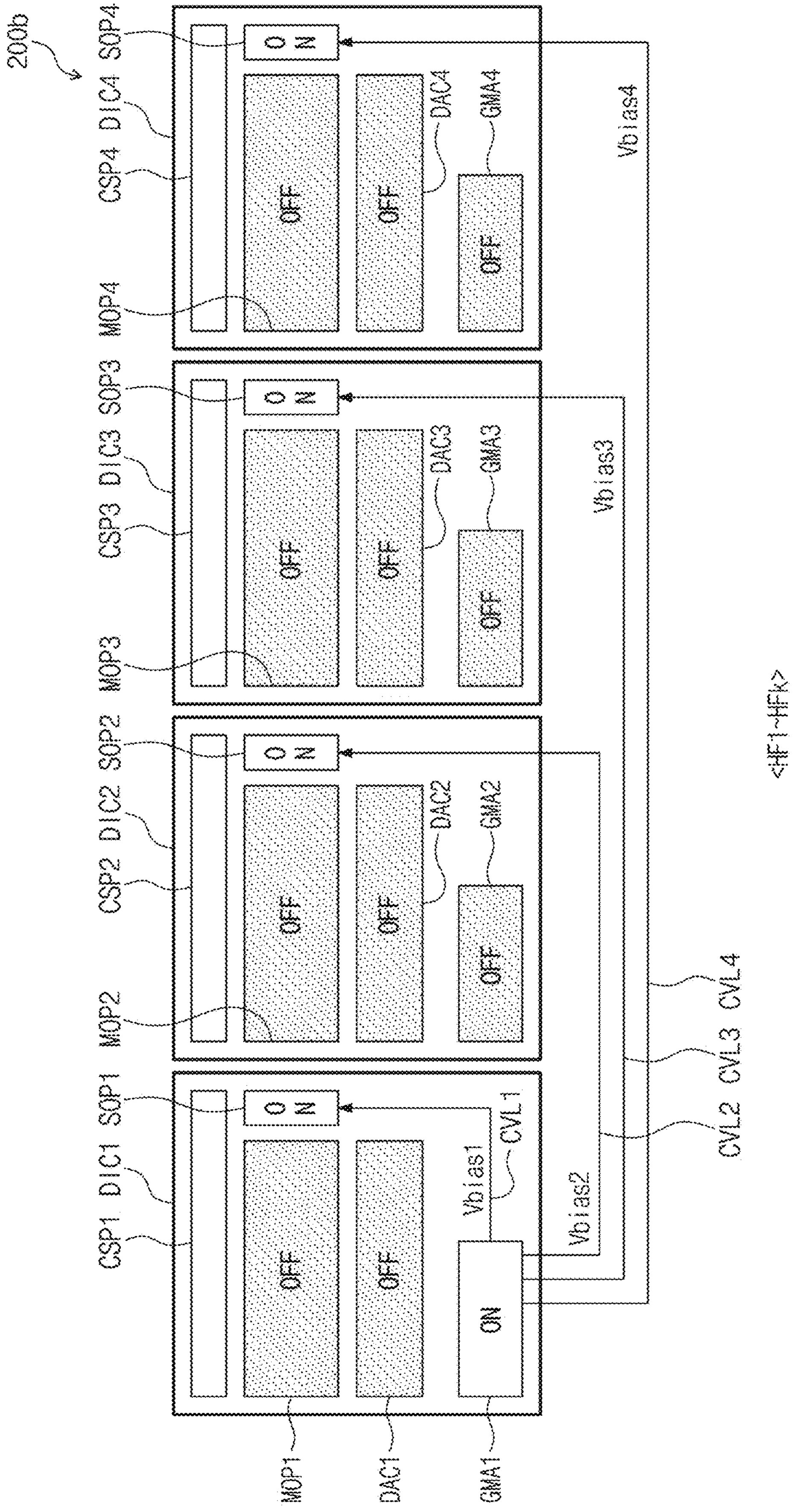
FIG. 10 is a block diagram illustrating a connection between first to fourth driving chips in holding frames of a second driving mode according to still another embodiment of the invention.

FIG. 10 is a block diagram illustrating a connection between first to fourth driving chips in holding frames of a second driving mode according to still another embodiment of the invention. However, among components shown in FIG. 10, the same reference numerals are used for the same components as those shown in FIG. 7B, and a detailed description thereof will be omitted.

Referring to FIG. 10, a data driver 200*b* may include a plurality of connection wirings. As an example of the invention, the plurality of connection wirings may include first to fourth connection wirings CVL1 to CVL4. The first connection wiring CVL1 is disposed between the first gamma voltage generator GMA1 and the first sub-output part SOP1, and the second connection wiring CVL2 is disposed between the first gamma voltage generator GMA1 and the second sub-output part SOP2. The third connection wiring CVL3 is disposed between the first gamma voltage generator GMA1 and the third sub-output part SOP3, and the fourth connection wiring CVL4 is disposed between the first gamma voltage generator GMA1 and the fourth sub-output part SOP4.

During the k holding frames HF1 to HFk, the first gamma voltage generator GMA1 may generate a plurality of bias voltages. As an example of the invention, the plurality of bias voltages may include first to fourth bias voltages Vbias1 to Vbias4. The first bias voltage Vbias1 is provided to the first sub-output part SOP1 through the first connection wiring CVL1, and second bias voltage Vbias2 is provided to the second sub-output part SOP2 through the second connection wiring CVL2. The third bias voltage Vbias3 is provided to the third sub-output part SOP3 through the third connection wiring CVL3, and the fourth bias voltage Vbias4 is provided to the fourth sub-output part SOP4 through the fourth connection wiring CVL4. Voltage levels of the first to fourth bias voltages Vbias1 to Vbias4 may be different from one another. The voltage levels of the first to fourth bias voltages Vbias1 to Vbias4 may be set based on line resistance deviations of the first to fourth connection wirings CVL1 to CVL4.

Accordingly, a deviation between the actual bias voltages substantially received by the first to fourth sub-output parts SOP1 to SOP4 may be reduced, and as a result, a luminance deviation in an image displayed on the display panel DP (refer to FIG. 3) due to the deviation may be effectively prevented.

Figure 11:
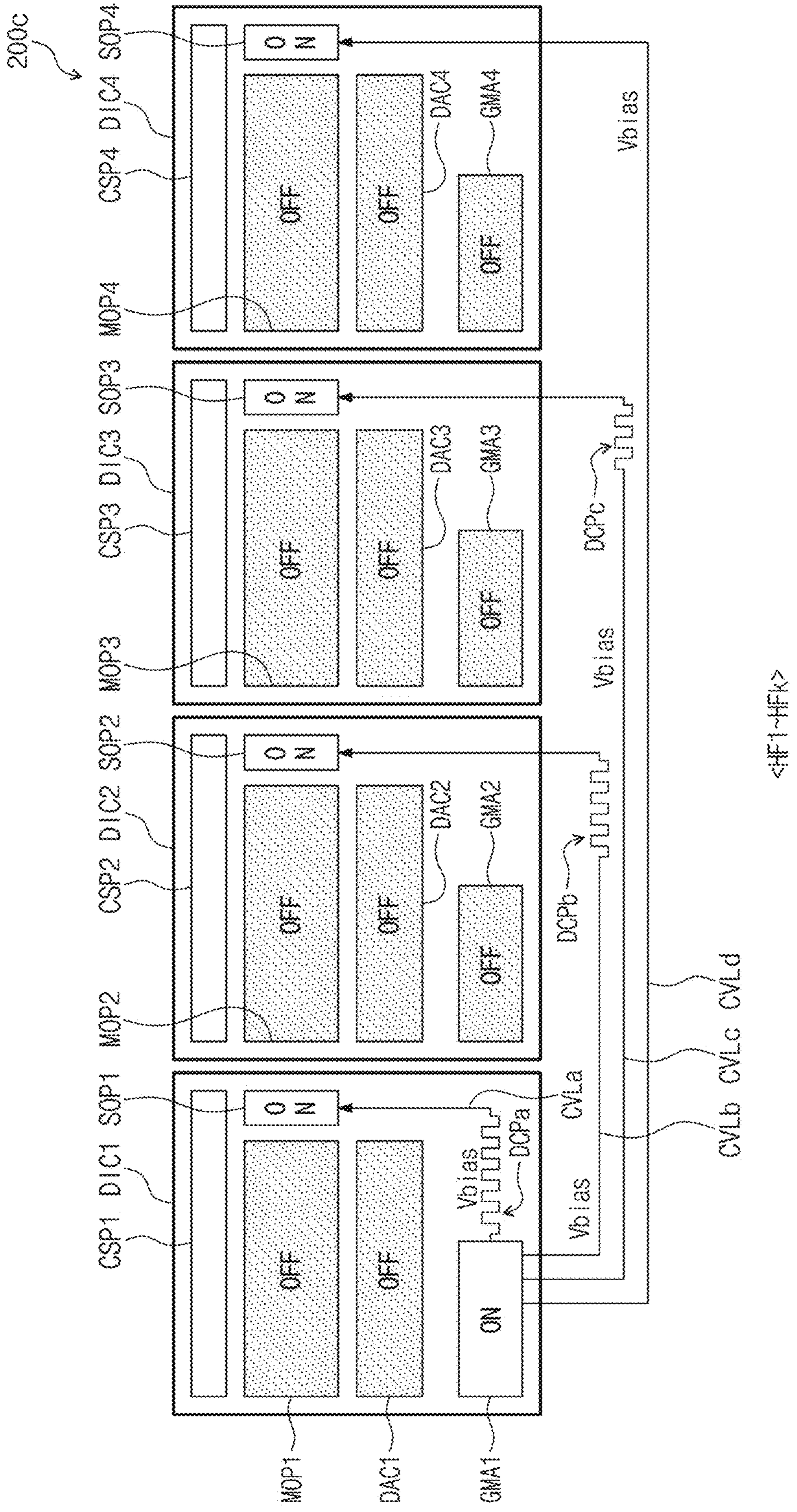
FIG. 11 is a block diagram illustrating a connection between first to fourth driving chips in holding frames of a second driving mode according to yet another embodiment of the invention.

FIG. 11 is a block diagram illustrating a connection between first to fourth driving chips in holding frames of a second driving mode according to yet another embodiment of the invention. However, among components shown in FIG. 11, the same reference numerals are used for the same components as those shown in FIG. 10, and a detailed description thereof will be omitted.

Referring to FIG. 11, a data driver 200*c* may include a plurality of connection wirings. As an example of the invention, the plurality of connection wirings may include first to fourth connection wirings CVLa to CVLd. The first connection wiring CVLa is disposed between the first gamma voltage generator GMA1 and the first sub-output part SOP1, and the second connection wiring CVLb is disposed between the first gamma voltage generator GMA1 and the second sub-output part SOP2. The third connection wiring CVLc is disposed between the first gamma voltage generator GMA1 and the third sub-output part SOP3, and the fourth connection wiring CVLd is disposed between the first gamma voltage generator GMA1 and the fourth sub-output part SOP4.

During the k holding frames HF1 to HFk, the first gamma voltage generator GMA1 may generate one bias voltage Vbias. The bias voltage Vbias is provided to the first sub-output part SOP1 through the first connection wiring CVLa and is provided to the second sub-output part SOP2 through the second connection wiring CVLb. The bias voltage Vbias is provided to the third sub-output part SOP3 through the third connection wiring CVLc and is provided to the fourth sub-output part SOP4 through the fourth connection wiring CVLd.

As an example of the invention, the first connection wiring CVLa includes a first compensation pattern part DCPa, the second connection wiring CVLb includes a second compensation pattern part DCPb, and the third connection wiring CVLc includes a third compensation pattern part DCPc. As an example of the invention, each of the first to third compensation pattern parts DCPa to DCPc may include a plurality of convexo-concave patterns. A distance difference may occur between the first gamma voltage generator GMA1 and the first to fourth sub-output parts SOP1 to SOP4, and due to the distance difference, a deviation may occur between the bias voltages Vbias supplied to the first to fourth connection wirings CVLa to CVLd. However, as the first to third compensation pattern parts DCPa to DCPc are provided to the first to third connection wirings CVLa to CVLc, respectively, a difference in line resistance between the first to fourth connection wirings CVLa to CVLd may be effectively reduced.

Accordingly, a deviation between actual bias voltages substantially received by the first to fourth sub-output parts SOP1 to SOP4 may be reduced, and as a result, due to the deviation, a luminance deviation in an image displayed on the display panel DP (refer to FIG. 3) due to the deviation may be effectively prevented.

Figure 12A:
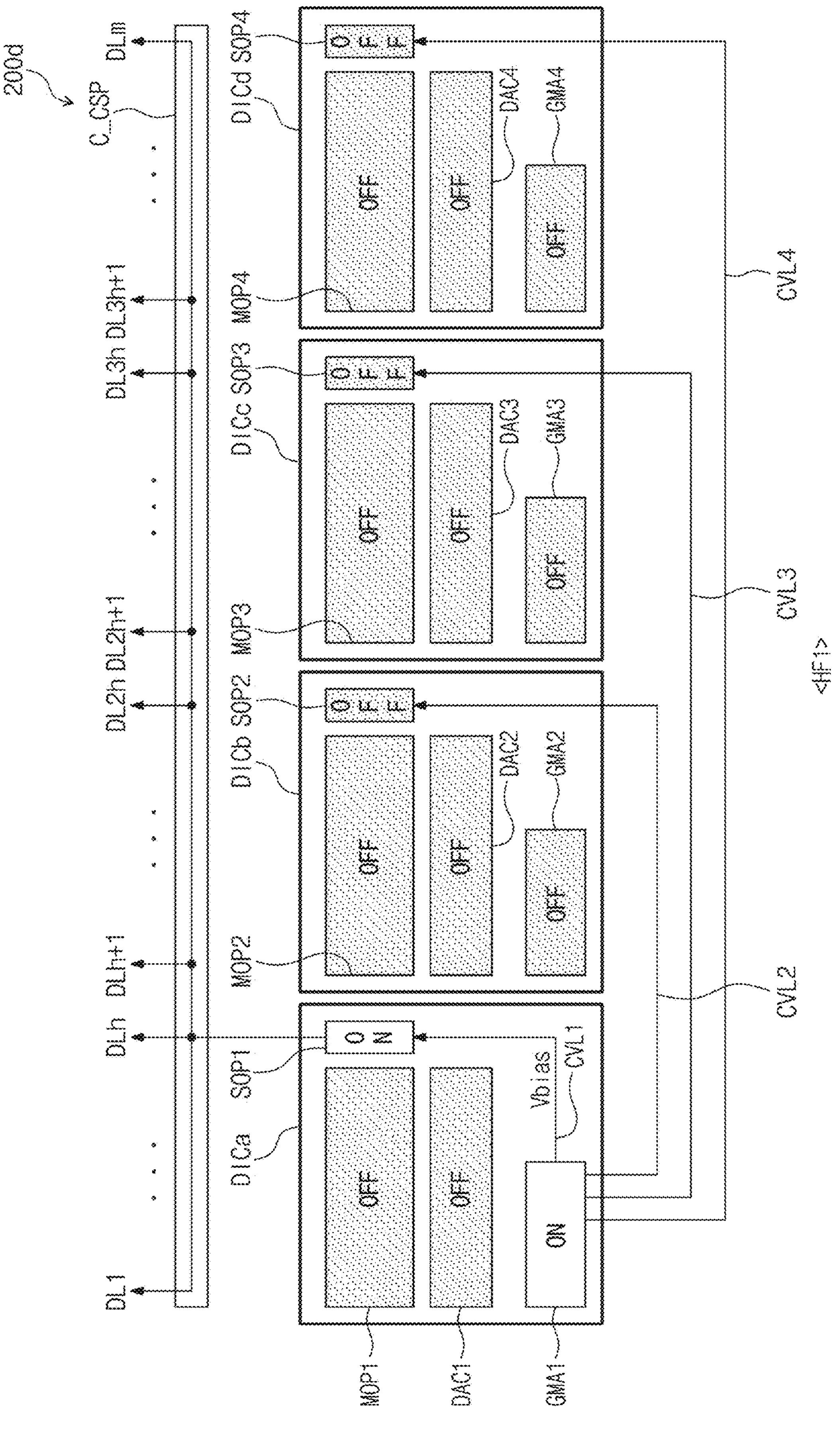
FIGS. 12A and 12B are block diagrams illustrating operations of first to fourth driving chips in holding frames of a second driving mode according to another embodiment of the invention.
Figure 12B:
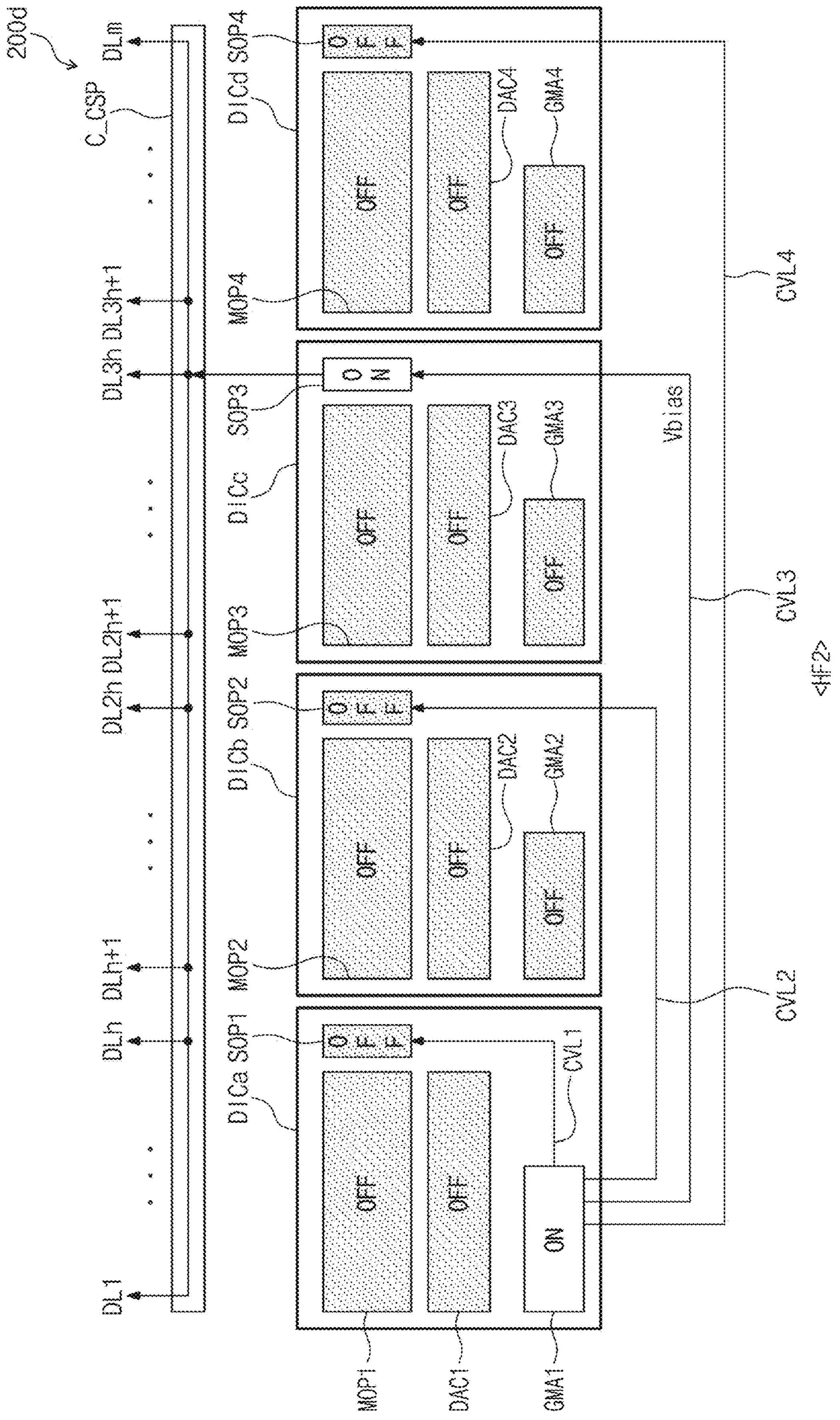

FIGS. 12A and 12B are block diagrams illustrating operations of first to fourth driving chips in holding frames of a second driving mode according to another embodiment of the invention. Among components illustrated in FIGS. 12A and 12B, the same reference numerals are used for the same components as those illustrated in FIG. 10, and a detailed description thereof will be omitted.

Referring to FIGS. 12A and 12B, a data driver 200*d* includes first to fourth driving chips DICa to DICd and a common switching part C_CSP.

The first driving chip DICa includes a first gamma voltage generator GMA1, a first data converter DAC1, a first main output part MOP1, and a first sub-output part SOP1. The second driving chip DICb includes a second gamma voltage generator GMA2, a second data converter DAC2, a second main output part MOP2, and a second sub-output part SOP2. The third driving chip DICc includes a third gamma voltage generator GMA3, a third data converter DAC3, a third main output part MOP3, and a third sub-output part SOP3. The fourth driving chip DICd includes a fourth gamma voltage generator GMA4, a fourth data converter DAC4, a fourth main output part MOP4, and a fourth sub-output part SOP4.

The common switching part C_CSP is connected to the first to fourth main output parts MOP1 to MOP4 and the first to fourth sub-output parts SOP1 to SOP4. The common switching part C_CSP has a structure similar to that of the first switching part CSP1 illustrated in FIGS. 8A and 8B. However, the common switching part C_CSP may include m first switching elements connected to the first to fourth main output parts MOP1 to MOP4 and m second switching elements connected to the first to fourth sub-output parts SOP1 to SOP4. That is, the number of first switching elements provided in the common switching part C_CSP may be equal to the number of all data lines DL1 to DLm, and the number of second switching elements may be equal to the number of all data lines DL1 to DLm.

The data driver 200*d* may include a plurality of connection wirings. As an example of the invention, the plurality of connection wirings may include first to fourth connection wirings CVL1 to CVL4. The first connection wiring CVL1 is disposed between the first gamma voltage generator GMA1 and the first sub-output part SOP1, and the second connection wiring CVL2 is disposed between the first gamma voltage generator GMA1 and the second sub-output part SOP2. The third connection wiring CVL3 is disposed between the first gamma voltage generator GMA1 and the third sub-output part SOP3, and the fourth connection wiring CVL4 is disposed between the first gamma voltage generator GMA1 and the fourth sub-output part SOP4. The first gamma voltage generator GMA1 may be referred to as a bias voltage generator that generates the bias voltage Vbias.

During one of k holding frames HF1 to HFk (e.g., a first holding frame HF1), the first gamma voltage generator GMA1 may provide the bias voltage Vbias to a selected one (e.g., the first sub-output part SOP1) selected from among the first to fourth sub-output parts SOP1 to SOP4. The first sub-output part SOP1 selected during the first holding frame HF1 may be turned on, and the remaining unselected (i.e., the second to fourth sub-output parts SOP2 to SOP4) may be turned off. The selected first sub-output part SOP1 may output a bias voltage Vbias, and the common switching part C_CSP may receive the bias voltage Vbias from the first sub-output part SOP1 and may provide the bias voltage Vbias to the data lines DL1 to DLm. That is, even when the unselected second to fourth sub-output parts SOP2 to SOP4 are turned off, the bias voltage Vbias may be supplied to the data lines DL1 to DLh corresponding to the first sub-output part SOP1 as well as the data lines DL1 to DLh corresponding to the first sub-output part SOP1, through the common switching part C_CSP.

During a next holding frame (e.g., a second holding frame HF2), the first gamma voltage generator GMA1 may provide the bias voltage Vbias to the other one (e.g., the third sub-output part SOP3) of the first to fourth sub-output parts SOP1 to SOP4. The selected third sub-output part SOP3 may output the bias voltage Vbias, and the common switching part C_CSP may receive the bias voltage Vbias from the third sub-output part SOP3 and may provide the bias voltage Vbias to the data lines DL1 to DLm. That is, even when the unselected first, second, and fourth sub-output parts SOP1, SOP2, and SOP4 are turned off, the bias voltage Vbias may also be supplied to the data lines DL1 to DLh, DLh+1 to DL2*h*, and DL3*h*+1 to DLm corresponding to the first, second, and fourth sub-output parts SOP1, SOP2, and SOP4 as well as the data lines DL2*h*+1 to DL3*h* corresponding to the third sub-output part SOP3, through the common switching part C_CSP.

As an example of the invention, the first gamma voltage generator GMA1 may select one of the first to fourth sub-output parts SOP1 to SOP4 in a predetermined order (e.g., DICa→DICc→DICb→DICd or DICa→DICd→DICc→DICb, etc.) to supply the bias voltage Vbias thereto. As the described above, one of the first to fourth sub-output parts SOP1 to SOP4 in the predetermined order may be selected to provide the bias voltage Vbias, and thus a luminance deviation due to a deviation in line resistance occurring between the first to fourth connection wirings CVL1 to CVL4 may be compensated.

In addition, during each holding frame HF1 to HFk, only one selected sub-output part among the first to fourth sub-output parts SOP1 to SOP4 may be turned on, and the other sub-output parts may be turned off, compared to a case in which all four sub-output parts SOP1 to SOP4 are turned on, and thus power consumed by the data driver 200*d* may be effectively reduced.

Figure 13A:
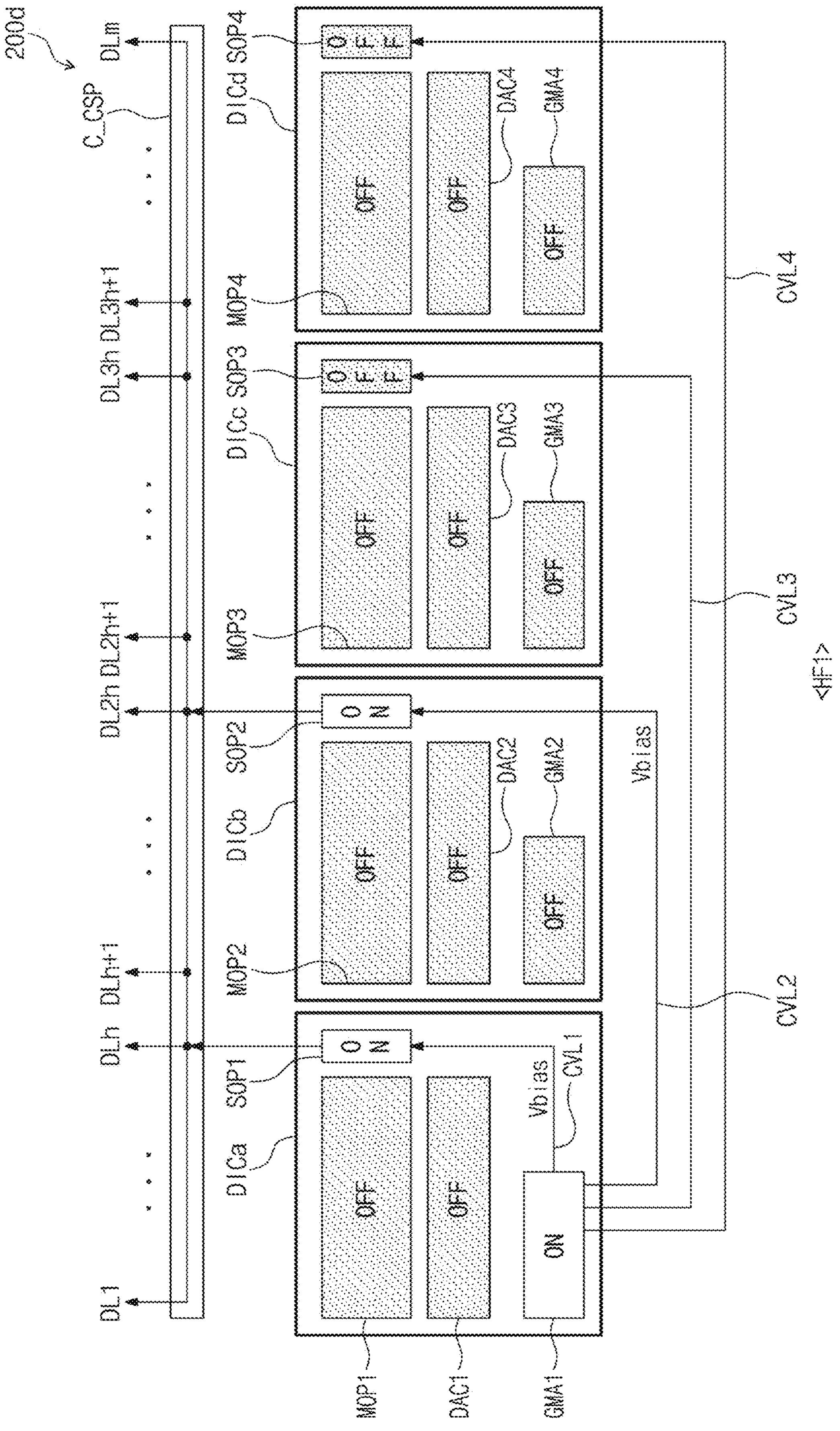
FIGS. 13A and 13B are block diagrams illustrating operations of first to fourth driving chips in holding frames of a second driving mode according to still another embodiment of the invention.
Figure 13B:
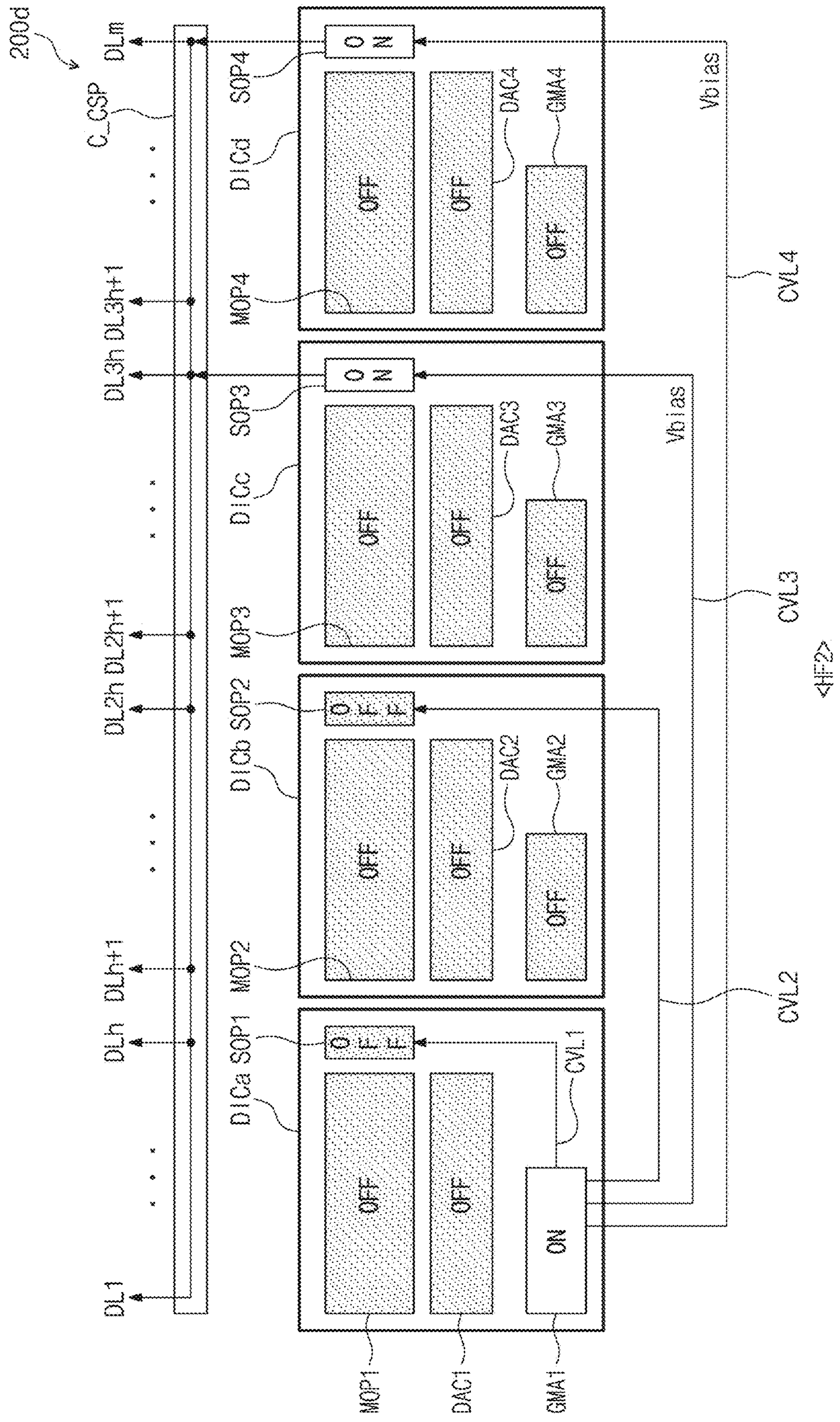

FIGS. 13A and 13B are block diagrams illustrating operations of first to fourth driving chips in holding frames of a second driving mode according to still another embodiment of the invention. Among components shown in FIGS. 13A and 13B, the same reference numerals are used for the same components as those shown in FIGS. 12A and 12B, and a detailed description thereof will be omitted.

Referring to FIGS. 13A and 13B, during one of the k holding frames HF1 to HFk (e.g., a first holding frame HF1), the first gamma voltage generator GMA1 may provide the bias voltage Vbias to two selected among the first to fourth sub-output parts SOP1 to SOP4 (e.g., the first and second sub-output parts SOP1 and SOP2). The first and second sub-output parts SOP1 and SOP2 selected during the first holding frame HF1 may be turned on, and the remaining unselected (i.e., the third and fourth sub-output parts SOP3 and SOP4) may be turned off. The selected first and second sub-output parts SOP1 and SOP2 may output a bias voltage Vbias, and the common switching part C_CSP may receive the bias voltage Vbias from the first and second sub-output parts SOP1 and SOP2 and provide the bias voltage Vbias to the data lines DL1 to DLm. That is, even when the unselected third and fourth sub-output parts SOP3 and SOP4 are turned off, the bias voltage Vbias may be supplied to the data lines DL2*h*+1 to DL3*h* and DL3*h*+1 to DLm corresponding to the third and fourth sub-output parts SOP3 and SOP4, as well as the data lines DL1 to DLh and DLh+1 to DL2*h* corresponding to the first and second sub-output parts SOP1 and SOP2, through the common switching part C_CSP.

During the next holding frame (e.g., the second holding frame HF2), the first gamma voltage generator GMA1 may provide the bias voltage Vbias to the other two (e.g., the third and fourth sub-output parts SOP3 and SOP4) of the first to fourth sub-output parts SOP1 to SOP4. The selected third and fourth sub-output parts SOP3 and SOP4 may output a bias voltage Vbias, and the common switching part C_CSP may receive the bias voltage Vbias from the third and fourth sub-output parts SOP3 and SOP4 and may provide the bias voltage Vbias to the data lines DL1 to DLm. That is, although the unselected first and second sub-output parts SOP1 and SOP2 are turned off, the bias voltage Vbias may be supplied to the data lines DL1 to DLh and DLh+1 to DL2*h* corresponding to the first and second sub-output parts SOP1 and SOP2, as well as the data lines DL2*h*+1 to DL3*h*+1 to DLm corresponding to the third and fourth sub-output parts SOP3 and SOP4, through the common switching part C_CSP.

As an example of the invention, the first gamma voltage generator GMA1 may select two of the first to fourth sub-output parts SOP1 to SOP4 in a predetermined order (e.g., DICa, DICb→DICc, DICd→DICa, DICc→DICb, DICd or DICa, DICc→DICb, DICd→DICa, DICd→DICb, DICc, etc.) to supply the bias voltage Vbias thereto. As the described above, the two of the first to fourth sub-output parts SOP1 to SOP4 may be selected in the predetermined order to provide the bias voltage Vbias, and thus the luminance deviation due to a deviation in line resistance occurring between the first to fourth connection wirings CVL1 to CVL4 may be compensated.

In addition, during each holding frame HF1 to HFk, only two selected sub-output parts among the first to fourth sub-output parts SOP1 to SOP4 may be turned on, and the remaining sub-output parts may be turned off, compared to a case in which all four sub-output parts SOP1 to SOP4 are turned on, and power consumed by the data driver 200*d* may be effectively reduced.

According to the invention, during the holding frame, the bias voltage generated from the gamma voltage generator included in the at least one selected driving chip among the driving chips may be supplied to the sub-output parts of the remaining unselected driving chips. Accordingly, the gamma voltage generators included in the remaining unselected driving chips may be turned off during the holding frame, and as a result, the overall power consumed by the data driver may be effectively reduced.

While embodiments are described above, a person skilled in the art may understand that many modifications and variations are made without departing from the spirit and scope of the invention defined in the following claims. Accordingly, the example embodiments of the invention should be considered in all respects as illustrative and not restrictive, with the spirit and scope of the invention being indicated by the appended claims.

What is claimed is:

1. A display device comprising:

a display panel including a plurality of pixels;

a data driver configured to output data signals to the plurality of pixels during a writing frame and configured to output a bias voltage to the plurality of pixels during a holding frame; and a scan driver configured to output scan signals to the plurality of pixels, wherein the data driver includes a plurality of driving chips, wherein each of the plurality of driving chips includes:

a gamma voltage generator configured to output a gamma voltage;

a data converter configured to convert image data into corresponding data signals of the data signals based on the gamma voltage;

a main output part configured to output the corresponding data signals during the writing frame; and a sub-output part configured to output the bias voltage during the holding frame, and wherein the gamma voltage generator of a selected driving chip among the plurality of driving chips is electrically connected to a plurality of sub-output parts which is disposed in the plurality of driving chips, respectively.

2. The display device of claim 1, wherein, during the holding frame, the gamma voltage generator of the selected driving chip is turned on, and the gamma voltage generator of an unselected driving chip among the plurality of driving chips is turned off.

3. The display device of claim 2, wherein, during the writing frame, the gamma voltage generators disposed in the plurality of driving chips, respectively, are turned on.

4. The display device of claim 1, wherein the gamma voltage generator of the selected driving chip supplies the bias voltage in common to the sub-output parts disposed in the plurality of driving chips, respectively.

5. The display device of claim 4, wherein the data driver further includes a connection wiring for commonly connecting the gamma voltage generator of the selected driving chip to the sub-output parts.

6. The display device of claim 5, wherein the data driver further includes a deviation compensator connected to the connection wiring to compensate a deviation of the bias voltage supplied to the sub-output parts.

7. The display device of claim 1, wherein the data driver further includes a plurality of connection wirings for connecting the gamma voltage generator of the selected driving chip to the sub-output parts, respectively, and wherein the gamma voltage generator of the selected driving chip applies bias voltages having different voltage levels to the sub-output parts, respectively.

8. The display device of claim 1, wherein the gamma voltage generator of the selected driving chip selects at least one sub-output part in a predetermined order from among the plurality of sub-output parts to supply the bias voltage thereto.

9. The display device of claim 8, wherein the data driver further includes:

a plurality of connection wirings for connecting the gamma voltage generator of the selected driving chip to the sub-output parts, respectively; and a common switching part commonly connected to the sub-output parts and configured to receive the bias voltage from at least one selected sub-output among the sub-outputs.

10. The display device of claim 1, wherein, during the writing frame, the main output part is turned on, the sub-output part is turned off, and wherein, during the holding frame, the main output part is turned off, the sub-output part is turned on.

11. The display device of claim 10, wherein the main output part includes a plurality of output buffers configured to output the corresponding data signals, respectively, and wherein the sub-output part includes a pull-down buffer configured to output the bias voltage.

12. The display device of claim 1, wherein, in a first driving mode, the display panel operates at a first panel frequency, and in a second driving mode, the display panel operates at a second panel frequency lower than the first panel frequency, wherein, in the first driving mode, the display panel displays a first image in units of a first driving frame, and in the second driving mode, the display panel displays a second image in units of a second driving frame, and wherein the second driving frame includes the writing frame and the holding frame.

13. A display device comprising:

a data driver configured to output data signals to a plurality of pixels during a writing frame and configured to output a bias voltage to the plurality of pixels during a holding frame; and a scan driver configured to output scan signals to the plurality of pixels, wherein the data driver includes a plurality of driving chips, wherein each of the plurality of driving chips includes:

a main output part configured to output corresponding data signals among the data signals during the writing frame; and a sub-output part configured to output the bias voltage during the holding frame, wherein a driving chip selected from among the plurality of driving chips further includes a bias voltage generator configured to generate the bias voltage, and wherein the bias voltage generator is electrically connected to a plurality of sub-output parts which is disposed in the plurality of driving chips, respectively.

14. The display device of claim 13, wherein each of the plurality of driving chips further includes:

a gamma voltage generator configured to output a gamma voltage; and a data converter configured to convert image data into the corresponding data signals based on the gamma voltage, and wherein the bias voltage generator is the gamma voltage generator of the selected driving chip.

15. The display device of claim 14, wherein, during the holding frame, the gamma voltage generator of the selected driving chip is turned on, and the gamma voltage generator of an unselected driving chip among the plurality of driving chips is turned off.

16. The display device of claim 13, wherein the bias voltage generator supplies the bias voltage in common to the sub-output parts disposed in the plurality of driving chips, respectively.

17. The display device of claim 16, wherein the data driver further includes a connection wiring configured to connect the bias voltage generator to the sub-output parts.

18. The display device of claim 13, wherein the bias voltage generator selects the sub-output parts in a predetermined order to supply the bias voltage thereto.

19. The display device of claim 18, wherein the data driver further includes:

a plurality of connection wirings configured to connect the bias voltage generator to the sub-output parts, respectively; and a common switching part commonly connected to the sub-outputs and configured to receive the bias voltage from at least one selected sub-output among the sub-outputs.

20. The display device of claim 13, wherein, in a first driving mode, the display panel operates at a first panel frequency, and in a second driving mode, the display panel operates at a second panel frequency lower than the first panel frequency, wherein, in the first driving mode, the display panel displays a first image in units of a first driving frame, and in the second driving mode, the display panel displays a second image in units of a second driving frame, and wherein the second driving frame includes the writing frame and the holding frame.

* * * * *